(12) United States Patent
Terasaki et al.

(10) Patent No.: US 8,593,942 B2
(45) Date of Patent: Nov. 26, 2013

(54) LOAD BALANCING COMMUNICATION DEVICE AND LOAD BALANCE MANAGEMENT DEVICE

(75) Inventors: Yasunori Terasaki, Kawasaki (JP); Osamu Shiraki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1191 days.

(21) Appl. No.: 11/851,494

(22) Filed: Sep. 7, 2007

(65) Prior Publication Data

US 2008/0008086 A1 Jan. 10, 2008

Related U.S. Application Data

(63) Continuation of application No. PCT/JP2005/004808, filed on Mar. 17, 2005.

(51) Int. Cl.

| | |
|---|---|
| *G06F 7/00* | (2006.01) |
| *G06F 17/00* | (2006.01) |
| *G06F 11/00* | (2006.01) |
| *G01R 31/08* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *G06F 9/46* | (2006.01) |
| *H04L 29/08* | (2006.01) |
| *G06F 11/20* | (2006.01) |

(52) U.S. Cl.
CPC .... *H04L 29/08279* (2013.01); *H04L 29/08144* (2013.01); *H04L 67/1002* (2013.01); *G06F 11/202* (2013.01); *G06F 11/2023* (2013.01); *G06F 11/2025* (2013.01); *G06F 11/2028* (2013.01); *G06F 11/2038* (2013.01); *G06F 11/2041* (2013.01); *G06F 11/2066* (2013.01)

USPC ........... 370/221; 370/216; 370/219; 370/220; 370/242; 709/201; 709/203; 718/105; 707/640; 707/652

(58) Field of Classification Search
CPC .............. G06F 11/202; G06F 11/2023; G06F 11/2025; G06F 11/2028; G06F 11/2035; G06F 11/2041; G06F 11/2066
USPC ................. 370/419, 216, 219, 220, 221, 242; 709/26, 224, 229, 201, 203; 718/105; 707/640, 652

See application file for complete search history.

(56) References Cited

U.S. PATENT DOCUMENTS

| 7,437,594 | B1 * | 10/2008 | Mount et al. ........................ 714/4 |
|---|---|---|---|
| 2002/0023161 | A1 | 2/2002 | Ito |
| 2002/0087694 | A1 * | 7/2002 | Daoud et al. .................. 709/226 |
| 2003/0118004 | A1 * | 6/2003 | Pan ................. 370/352 |
| 2004/0019705 | A1 * | 1/2004 | Ogura ........................ 709/253 |
| 2004/0264398 | A1 * | 12/2004 | Chu et al. ...................... 370/312 |
| 2005/0005006 | A1 * | 1/2005 | Chauffour et al. ............ 709/223 |
| 2005/0198231 | A1 * | 9/2005 | Gasca et al. .................. 709/221 |
| 2005/0261985 | A1 * | 11/2005 | Miller et al. .................... 705/26 |
| 2005/0262381 | A1 * | 11/2005 | Ishida ............................... 714/4 |

FOREIGN PATENT DOCUMENTS

| JP | 09-083611 | 3/1997 |
|---|---|---|
| JP | 2002-055840 | 2/2002 |
| JP | 2002-064590 | 2/2002 |

OTHER PUBLICATIONS

International Search Report dated May 17, 2005.

\* cited by examiner

*Primary Examiner* — Ayaz Sheikh
*Assistant Examiner* — Tarell Hampton
(74) *Attorney, Agent, or Firm* — Katten Muchin Rosenman LLP

(57) ABSTRACT

In a load balancing communication device and a load balance management device configuring a load balancing system, a storage holds, when the device is a load balancing communication device of a working system, working communication information of the device itself and protection communication information corresponding to working communication information of another or other load balancing communication devices of the working system, or holds, when the device is a load balancing communication device of a redundant system, protection communication information corresponding to working communication information of another or other load balancing communication devices of the working system, and a processing share management portion instructs, when communication processing is no longer performed with the working communication information in the load balancing communication device of the working system, a frame processor to perform communication processing by making the protection communication information corresponding to the working communication information working communication information.

11 Claims, 20 Drawing Sheets

| | 600a | 600b | 600c |
|---|---|---|---|
| | GROUP | COMMUNICATION INFORMATION | NO. OF LOAD BALANCING COMMUNICATION DEVICE HOLDING COMMUNICATION INFORMATION |
| | 1 | 18_1 | 100_1, 100_5 |
| | 2 | 18_2 | 100_2, 100_1 |
| | 3 | 18_3 | 100_3, 100_2, 100_6 |
| | 4 | 18_4 | 100_4, 100_3 |
| | 5 | 18_5 | 100_5, 100_4, 100_6 |

FIG.6

| BLOCK | FUNCTION |
|---|---|
| TRANSMITTER/RECEIVER 10 | FRAMES 700-703 ARE TRANSMITTED/RECEIVED TO/FROM EXTERNAL DEVICE |
| PROCESSING SHARE MANAGEMENT PORTION 11x,11y | • COMMUNICATON PROCESSING WHICH CORRESPONDING DEVICE SHOULD SHARE IN ENTIRE SYSTEM IS MANAGED<br>• EMBODIMENT (1): NORMALITY INDICATING FRAME MONITORING FUNCTION IS INSTALLED IN ORDER THAT COMMUNICATION DEVICE 100 AUTONOMOUSLY (WITHOUT LOAD BALANCE MANAGEMENT DEVICE 200y) MANAGES COMMUNICATION PROCESSING SHARE<br>• EMBODIMENT (2): LOAD BALANCE MANAGEMENT DEVICE 200y PERFORMS COMMUNICATION PROCESSING SHARE MANAGEMENT AND COMMUNICATION DEVICE 100 OPERATES ACCORDING TO INSTRUCTIONS OF MANAGEMENT DEVICE 200y |
| FRAME PROCESSOR 15 | • PROCESSING OF PROCESSING SUBJECT FRAME 700 SHARED BY CORRESPONDING DEVICE IS PERFORMED<br>• EXAMPLE 1: WHEN LOAD BALANCING COMMUNICATION DEVICE 100 IS SERVER LOAD BALANCER, LOAD BALANCING IS PERFORMED TO RECEIVED FRAME 700 TO BE TRANSMITTED TO SERVER 300<br>• EXAMPLE 2: WHEN LOAD BALANCING COMMUNICATION DEVICE 100 IS ROUTER, RECEIVED FRAME 700 IS TRANSMITTED ACCORDING TO ROUTING TABLE |
| PROTOCOL PROCESSOR 16 | • PROCESSING OF PROTOCOL RELATED TO FRAME PROCESSING IS PERFORMED<br>• IN CASE OF e.g. ROUTER, PROCESSING OF FRAME 701 EXCHANGING ROUTING INFORMATION IS PERFORMED AND ROUTING TABLE etc. STORING ROUTING INFORMATION IS UPDATED; BOTH WORKING COMMUNICATION INFORMATION OF MASTER PROCESSING (SHARED BY CORRESPONDING DEVICE) AND PROTECTION COMMUNICATION INFORMATION OF BACKUP (SHARED BY OTHER DEVICE) IS UPDATED |
| STORAGE 17 | • COMMUNICATION INFORMATION REQUIRED FOR FRAME PROCESSING (COMMUNICATION PROCESSING) IS STORED<br>• MASTER (WORKING) COMMUNICATION INFORMATION OF CORRESPONDING DEVICE AND BACKUP (PROTECTION) COMMUNICATION INFORMATION OF OTHER LOAD BALANCING COMMUNICATION DEVICE 100 IS STORED |

FIG.15A

23 MANAGEMENT TABLE

| COMMUNICA-TION DEVICE (23a) | WORKING COMMUNICATION INFORMATION (23b) | PROTECTION COMMUNICATION INFORMATION (23c) |
|---|---|---|
| 100y_1 | 18_1 | 18_2 |
| 100y_2 | 18_2 | 18_3 |
| 100y_3 | 18_3 | 18_4 |
| 100y_4 | 18_4 | 18_1 |
| 100y_5 | - | 18_1, 18_2 |

T41: STOP NORMALITY INDICATING FRAME 702 OF DEVICE 100y_4 →

FIG.15B

23 MANAGEMENT TABLE

| COMMUNICA-TION DEVICE (23a) | WORKING COMMUNICATION INFORMATION (23b) | PROTECTION COMMUNICATION INFORMATION (23c) |
|---|---|---|
| 100y_1 | 18_1 | 18_2 |
| 100y_2 | 18_2 | 18_3 |
| 100y_3 | 18_3 | 18_4 |
| 100y_4 | 18_4 | 18_1 |
| 100y_5 | - | 18_1, 18_2 |

T42: UPDATE MANAGEMENT INFORMATION

FIG.15C

23 MANAGEMENT TABLE

| COMMUNICA-TION DEVICE (23a) | WORKING COMMUNICATION INFORMATION (23b) | PROTECTION COMMUNICATION INFORMATION (23c) |
|---|---|---|
| 100y_1 | 18_1 | 18_2 |
| 100y_2 | 18_3 | 18_2 |
| 100y_3 | 18_4 | 18_3 |
| 100y_4 | - | - |
| 100y_5 | 18_2 | 18_1 |

T43: TRANSMIT MANAGEMENT FRAME 703

FIG.15D

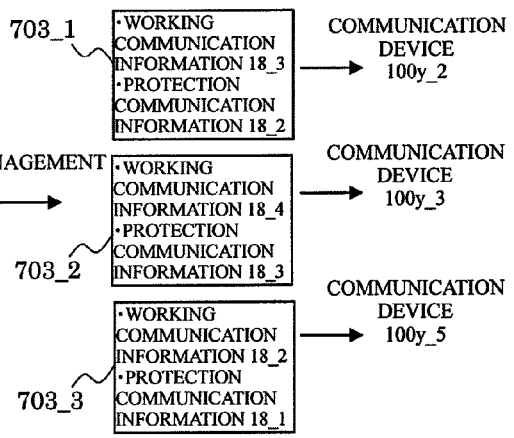

FIG.16A

23 MANAGEMENT TABLE

| COMMUNICA-TION DEVICE (23a) | WORKING COMMUNICATION INFORMATION (23b) | PROTECTION COMMUNICATION INFORMATION (23c) |
|---|---|---|
| 100y_1 | 18_1 | 18_2 |
| 100y_2 | 18_2 | 18_3 |
| 100y_3 | 18_3 | 18_4 |
| 100y_4 | 18_4 | 18_1 |
| 100y_5 | - | 18_1, 18_4 |

T51: STOP NORMALITY INDICATING FRAME 702 OF DEVICE 100y_4 →

FIG.16B

23 MANAGEMENT TABLE

| COMMUNICA-TION DEVICE (23a) | WORKING COMMUNICATION INFORMATION (23b) | PROTECTION COMMUNICATION INFORMATION (23c) |
|---|---|---|
| 100y_1 | 18_1 | 18_2 |
| 100y_2 | 18_2 | 18_3 |
| 100y_3 | 18_3 | 18_4 |
| 100y_4 | 18_4 | 18_1 |
| 100y_5 | - | 18_1, 18_4 |

T52: UPDATE MANAGEMENT INFORMATION

FIG.16C

23 MANAGEMENT TABLE

| COMMUNICA-TION DEVICE (23a) | WORKING COMMUNICATION INFORMATION (23b) | PROTECTION COMMUNICATION INFORMATION (23c) |
|---|---|---|
| 100y_1 | 18_1 | 18_2 |
| 100y_2 | 18_2 | 18_3 |
| 100y_3 | 18_3 | 18_4 |
| 100y_4 | · | · |
| 100y_5 | 18_4 | 18_1 |

T53: TRANSMIT MANAGEMENT FRAME 703 →

FIG.16D

MANAGEMENT FRAME 703

703_3
- WORKING COMMUNICATION INFORMATION 18_4
- PROTECTION COMMUNICATION INFORMATION 18_1

TRANSMITTING DESTINATION

COMMUNICATION DEVICE → 100y_5

LOAD BALANCING COMMUNICATION DEVICE AND LOAD BALANCE MANAGEMENT DEVICE

CROSS-REFERENCE TO RELATED APPLICATION

This application is a continuation of International Application PCT/JP2005/004808 filed on Mar. 17, 2005, the contents of which are herein wholly incorporated by reference.

BACKGROUND OF THE INVENTION

1. Field of the Invention

The present invention relates to a load balancing communication device and a load balance management device, and in particular to a load balancing communication device and a load balance management device configuring a load balancing system.

Recently, with the rapid developments in communication technologies, network transmission rates and traffics have increased, so that cases where communication processing can not be performed by a single communication device (a firewall, a server load balancer, etc.) have occurred. Therefore, a load balancing system is configured in which a plurality of communication devices are connected in parallel to perform load balance processing (load balancing), so that cases are increasing where an overall communication processing performance is enhanced. In such a load balancing system, a redundancy method of a communication device accommodating to an occasion of failure occurrence is important.

2. Description of the Related Art

FIG. 20 shows a load balance redundancy method (or system) (1) configured by prior art load balancing communication devices 100a. This method (1) is a 1+1 redundancy method, where load balancing communication devices 100a_11-100a_51 of a redundant system are respectively connected to load balancing communication devices 100a_10-100a_50 of a working system, and the load balancing communication devices 100a_11-100i a_51 hold protection (redundant) communication information 18_11-18_51 corresponding to working communication information 18_10-18_50 of the load balancing communication devices 100a_10-100a_50.

As a prior art example of the 1+1 redundancy method, the following method can be mentioned: When a concentrated control module detects a failure having occurred in a balance module (corresponding to the above-mentioned load balancing communication device), communication service access (communication processing) to a failure suffered module is immediately stopped by cooperation with the other module. When the failure suffered module completes restoration, the communication service access is immediately restored. When a failure occurs in a function balance module, a failure restoration monitoring timer is provided in the concentrated control module, and a backup relationship is prescribed between the modules (1+1 redundancy method). When the failure is not restored within a fixed time, processing is taken over by the backup side (redundant system) (see e.g. patent document 1).

FIG. 21 shows a load balance redundancy method (2) configured by prior art load balancing communication devices 100b (representing reference numerals 100b_1-100b_6). This method (2) is an N+1 redundancy method, in which a single load balancing communication device 100b_6 of a redundant system is connected to the load balancing communication devices 100b_1-100b_5 of a working system, and the load balancing communication device 100b_6 holds protection communication information 18_1-18_5 corresponding to working communication information 18_1-18_5 of the load balancing communication devices 100b_1-100b_5.

Patent document 1: Japanese Patent Application Laid-open No. 9-83611

In the above-mentioned load balance redundancy (1+1 redundancy) method (1), there is a problem that when N pieces of load balancing communication devices of the working system (hereinafter, occasionally referred to as communication devices of the working system) are required, the twice number (2N) of communication devices are required, so that the system cost is increased.

Also, in the load balance redundancy (N+1 redundancy) method (2), while the number of communication devices required is N+1, it is required for the load balancing communication device of the redundant system (hereinafter, occasionally referred to as a communication device of the redundant system) 100b_6 by itself to hold the protection communication information (session information etc.) 18_1-18_5 of the communication devices 100b_1-100b_5 of the working system, so that resources corresponding thereto are increased as the number N of devices required becomes larger. As a result, there is a problem that the communication device 100b_6 of the redundant system has a configuration different from those of the other communication devices 100b_1-100b_5 of the working system, not only a compatibility with the communication devices 100b_1-100b_5 of the working system is eliminated but also the cost is increased.

Supposing that the communication device of the redundant system is made the same as that of the working system in order to solve the problem of compatibility, the communication device of the redundant system becomes unable to hold communication information for N pieces of devices. In this case, it is required for the communication device of the redundant system to take over the communication information not held from the communication device of the working system upon a switchover occurrence. As a result, there is a problem that a session interruption occurs due to time required for taking over of the communication information, so that communication is stopped.

SUMMARY OF THE INVENTION

It is accordingly an object of the present invention to provide a load balancing communication device and a load balance management device configuring a load balancing system which have a compatibility between the load balancing communication devices of a working and redundant systems, require fewer resources, and perform communication switchover processing without an occurrence of a communication processing stop.

In order to achieve the above-mentioned object, a load balancing communication device of a working system or a redundant system configuring a load balancing system comprises: a storage holding, when the device is a load balancing communication device of the working system, working communication information of the device itself and protection communication information corresponding to working communication information of another or other load balancing communication devices of the working system, or holding, when the device is a load balancing communication device of the redundant system, protection communication information corresponding to working communication information of another or other load balancing communication devices of the working system; a frame processor performing communication processing of a frame based on the working communication information; and a processing share management portion instructing, when communication processing is no longer performed with the working communication information in the load balancing communication device of the working system, the frame processor to perform communication processing by making the protection communication information corresponding to the working communication information working communication information.

FIG. 1 shows a load balancing system configured by a load balancing communication device and a load balance management device according to the present invention. This system is formed of load balancing communication devices of a working system (hereinafter, occasionally referred to as communication devices of a working system) 100_1-100_5 (hereinafter, occasionally represented by a reference numeral 100) and a load balancing communication device of a redundant system (hereinafter, occasionally referred to as a communication device of a redundant system) 100_6. In each communication device 100 of the working system, a storage (see a portion indicated by a circle) holds working communication information of the device itself and protection communication information corresponding to working communication information of another or other communication devices 100 of the working system. For example, the communication device 100_1 of the working system holds working communication information 18_1 (indicated by a circle of a thick line) of the device 100_1 itself as well as working communication information 18_2 (indicated by a circle with a thick line) of the communication device 100_2 of the working system as protection communication information 18_2 (indicated by a circle).

The storages of the other communication devices 100_2-100_5 of the working system similarly hold protection communication information 18_3-18_5, and 18_1 respectively. Working communication information 18_1-18_5 of all of the load balancing communication devices 100_1-100_5 is set to be held in at least one of the other load balancing communication devices 100 as protection communication information 18_1-18_5. Also, in the communication device 100_6 of the redundant system, the storage holds working communication information of another or more communication devices 100 of the working system as protection communication information. In FIG. 1, the communication device 100_6 of the redundant system stores the working communication information 18_3 and 18_5 of the communication devices 100_3 and 100_5 of the working system as protection communication information 18_3 and 18_5. It is to be noted that any collection method of the protection communication information may be applied to the present invention. For example, the working communication information may be transmitted between the communication devices of the working system.

In each communication device 100 of the working system, a frame processor (not shown) performs processing of a frame based on the working communication information of the device itself. When a failure has occurred and is detected by some method in a communication device corresponding to protection communication information held by the storage, a processing share management portion (not shown) instructs the frame processor to perform the frame processing by making the protection communication information working communication information in place of the working communication information of the device itself.

When a failure has occurred in e.g. the load balancing communication device 100_1 of the working system in FIG. 1, the load balancing communication device 100_5 holding the protection communication information 18_1 of the communication device 100_1 performs communication processing by making the protection communication information 18_1 the working communication information 18_1, in place of the communication processing based on the working communication information 18_5 of the device 100_5 itself. The load balancing communication device 100_6 of the redundant system having recognized that the communication processing had not been performed based on the working communication information 18_5 in the load balancing communication device 100_5 performs communication processing by making the protection communication information 18_5 the working communication information 18_5. Thus, by interlocking a single or a plurality of redundancy groups, a high-speed communication processing switchover without a communication processing stop becomes possible.

Also, in the present invention according to the above-mentioned present invention, protection communication information corresponding to working communication information of all load balancing communication devices of the working system may be set so as to be held in at least another load balancing communication device.

FIG. 2 is a table 600 showing one example in which the communication information 18_1-18_5 is held in the load balancing communication devices 100_1-100_5 of the working system and the load balancing communication device 100_6 of the redundant system as working information and protection information. In this table 600, the communication information 18_1 is held in the communication devices 100_1 and 100_5 of the working system. The communication device 100_1 of the working system performs communication processing by making the communication information 18_1 the working communication information, and the communication device 100_5 of the working system holds the communication information 18_1 as the protection communication information.

The communication information 18_2 is held in the communication devices 100_2 and 100_1 of the working system respectively as the working and protection information. The communication information 18_3 is held in the communication device 100_3 of the working system as the working communication information 18_3, and is held in the communication device 100_2 of the working system and the communication device 100_6 of the redundant system as the protection communication information 18_3. The same applies to the communication information 18_4 and 18_5. Namely, each of the communication information 18_1-18_5 is stored in at least another communication device of the working or redundant system as the protection communication information.

Also, in the present invention according to the above-mentioned invention, when there are plural pieces of protection communication information corresponding to identical working communication information, a relative priority may be set to each of the protection communication information.

Namely, in some cases, working communication information of a single load balancing communication device of the working system is held in a plurality of other load balancing communication devices of the working and redundant systems as the corresponding protection communication information.

Accordingly, priority indicating, when a failure has occurred in the load balancing communication device of the working system, which protection communication information or which load balancing communication device should substituted for the working communication information is set.

The method by which the processing share management portion recognizes the priority of the protection communication information is not herein questioned.

Also, in the present invention according to the above-mentioned invention, the priority of the protection communication information stored in the storage of the load balancing communication device of the redundant system may be set relatively high. Thus, it becomes possible to eliminate wasteful communication switchover processing.

Also, in the present invention according to the above-mentioned invention, the processing share management portion may transmit a normality (normal operation) indicating frame indicating that the device is normally performing communication processing, and recognize a load balancing communication device where a failure has occurred, based on a normality indicating frame from another load balancing communication device.

FIG. 3 shows a switchover principle (1) of the communication processing in the load balancing communication device according to the present invention. In this principle (1), a failure of the load balancing communication device of the working system is recognized by another load balancing communication device to switch over the communication processing. Hereinafter, this switchover principle (1) will be described.

The load balancing communication devices $100x\_1$-$100x\_5$ of the working system continuously transmit normality indicating frames $702\_1$-$702\_5$ (not shown) indicating that the devices themselves are normally operating with the working communication information $18\_1$-$18\_5$, respectively.

Steps T11 and T12: A failure has occurred in the working load balancing communication device $100x\_1$, so that the device $100x\_1$ stops the transmission of the normality indicating frame $702\_1$ indicating that the device $100x\_1$ itself has been operating with the working communication information $18\_1$.

Step T13: Since not receiving the normality indicating frame $702\_1$, the load balancing communication device $100x\_5$ recognizes that the communication processing with the working communication information $18\_1$ corresponding to the protection communication information $18\_1$ held by the device $100x\_5$ itself is stopped (a failure has occurred in the communication device $100x\_1$ in this case), so that the protection communication information $18\_1$ is switched over to the working communication information $18\_1$ and the working communication information $18\_5$ is switched over to the protection communication information.

Step T14: Furthermore, the load balancing communication device $100x\_5$ stops the transmission of the normality indicating frame $702\_5$ indicating that the communication processing has been performed with the working communication information $18\_5$.

Step T15: Since not receiving the normality indicating frame $702\_5$, the load balancing communication device $100x\_6$ of the redundant system recognizes that the communication processing with the working communication information $18\_5$ corresponding to the protection communication information $18\_5$ held by the device $100x\_6$ itself is stopped (the working communication information $18\_5$ is switched over to the protection communication information in this case), so that the protection communication information $18\_5$ is switched over to the working communication information $18\_5$.

Also, in the present invention according to the above-mentioned invention, where a load balancing communication device of the working system is further added to the load balancing system, the device which is the load balancing communication device of the redundant system may hold protection communication information corresponding to working communication information of the added load balancing communication device of the working system, and the device which is the added load balancing communication device of the working system may hold its own working communication information and protection communication information which has become unable to be held when the load balancing communication device of the redundant system holds the protection communication information corresponding to the working communication information of the added load balancing communication device of the working system. Thus, it becomes possible to autonomously add the load balancing communication device to the load balancing system.

Furthermore, in the present invention according to the above-mentioned invention, where the load balancing communication device of the working system is deleted from the load balancing system, the device which holds protection communication information of the deleted load balancing communication device may hold protection communication information which the deleted load balancing communication device has held in place of the protection communication information of the deleted load balancing communication device. Thus, it becomes possible to autonomously delete the load balancing communication device from the load balancing system.

Also, in order to achieve the above-mentioned object, a load balance management device according to the present invention configuring the load balancing system is connected to the load balancing communication device of the above-mentioned present invention, comprising: a management table managing the working communication information and the protection communication information held by the load balancing communication device of the working system or the redundant system; a monitoring portion monitoring whether or not a failure has occurred in the load balancing communication device of the working system; and a processing share management portion instructing, referring to the management table, the load balancing communication device holding the protection communication information corresponding to the load balancing communication device of the working system where the failure has occurred, to perform communication processing by making the protection communication information working communication information.

FIG. 4 shows a switchover principle (2) of the communication processing in the load balancing communication device and the load balance management device according to the present invention. In this principle (2), the load balance management device detects a failure of the load balancing communication device of the working system, and instructs another load balancing communication device to perform the communication processing. Hereinafter, this switchover principle (2) will be described.

The load balancing communication devices $100y\_1$-$100y\_5$ continuously transmit normality indicating frames $702\_1$-$702\_5$ (not shown) indicating that the devices themselves are normally operating with the working communication information $18\_1$-$18\_5$ respectively.

Steps T21 and T22: When a failure has occurred in the load balancing communication device $100y\_1$ of the working system, the device $100y\_1$ stops the transmission of the normality indicating frame $702\_1$ indicating that the device $100y\_1$ itself has been operating with the working communication information $18\_1$.

Steps T23 and T24: Since not receiving the normality indicating frame 702_1, a load balance management device 200$y$ recognizes that the communication processing with the working communication information 18_1 is stopped (a failure has occurred in the communication device 100$y$_1 in this case), so that the load balance management device 200$y$ instructs, by referring to a management information table (not shown), a communication device 100$y$_5 holding the protection communication information 18_1 to switch the protection communication information 18_1 over to the working communication information.

Steps T25 and T26: The load balancing communication device 100$y$_5 of the working system having received the instructions switches the protection communication information 18_1 over to the working communication information, and the working communication information 18_5 over to the protection communication information. Furthermore, in order to indicate that the communication processing based on the working communication information 18_5 is stopped, the load balancing communication device 100$y$_5 stops the transmission of the normality indicating frame 702_5.

Steps T27 and T28: In the same way as steps T23 and T24, the load balance management device 200$y$ recognizes that the communication processing with the working communication information 18_5 is stopped, and instructs a load balancing communication device 100$y$_6 of the redundant system holding the protection communication information 18_5 to switch the protection communication information 18_5 over to the working communication information.

Step T29: The load balancing communication device 100$y$_6 of the redundant system having received the instructions switches the protection communication information 18_5 over to the working communication information.

Also, in the present invention according to the above-mentioned present invention, when there are plural pieces of protection communication information corresponding to identical working communication information in the management information table, a priority may be set to the protection communication information, and the processing share management portion may instruct a load balancing communication device selected based on the priority to perform the communication processing.

Also, in the present invention according to the above-mentioned present invention, a priority of the protection communication information held by the load balancing communication device of the redundant system may be set relatively high in the table.

Thus, it becomes possible to eliminate a wasteful communication processing switchover.

As described above, according to the load balancing communication device and the load balance management device of the present invention, a redundant configuration without a communication processing stop is made possible. Also, it becomes possible to make the configurations of the load balancing communication device of the working and redundant systems identical. Namely, the load balancing communication devices of the working and redundant systems have a compatibility. Also, it is only necessary for the load balancing communication devices of the working and redundant systems to secure at least twice resources (storages) of a capacity required for the working communication information. Also, as for the number of necessary load balancing communication devices, only the number of devices corresponding to a necessary throughput+a single device are required.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 2 is a table showing one example in which working communication information of a load balancing communication device according to the present invention is held in a load balancing communication device as working and protection communication information;

FIG. 6 is a table showing a function example of constituents of a load balancing communication device according to the present invention;

FIGS. 15A-15D are diagrams showing an embodiment (1) of a management table in a load balance management device according to the present invention;

FIGS. 16A-16D are diagrams showing an embodiment (2) of a management table in a load balance management device according to the present invention;

DESCRIPTION OF THE EMBODIMENTS

Arrangement Embodiment (1)

Figure 1:
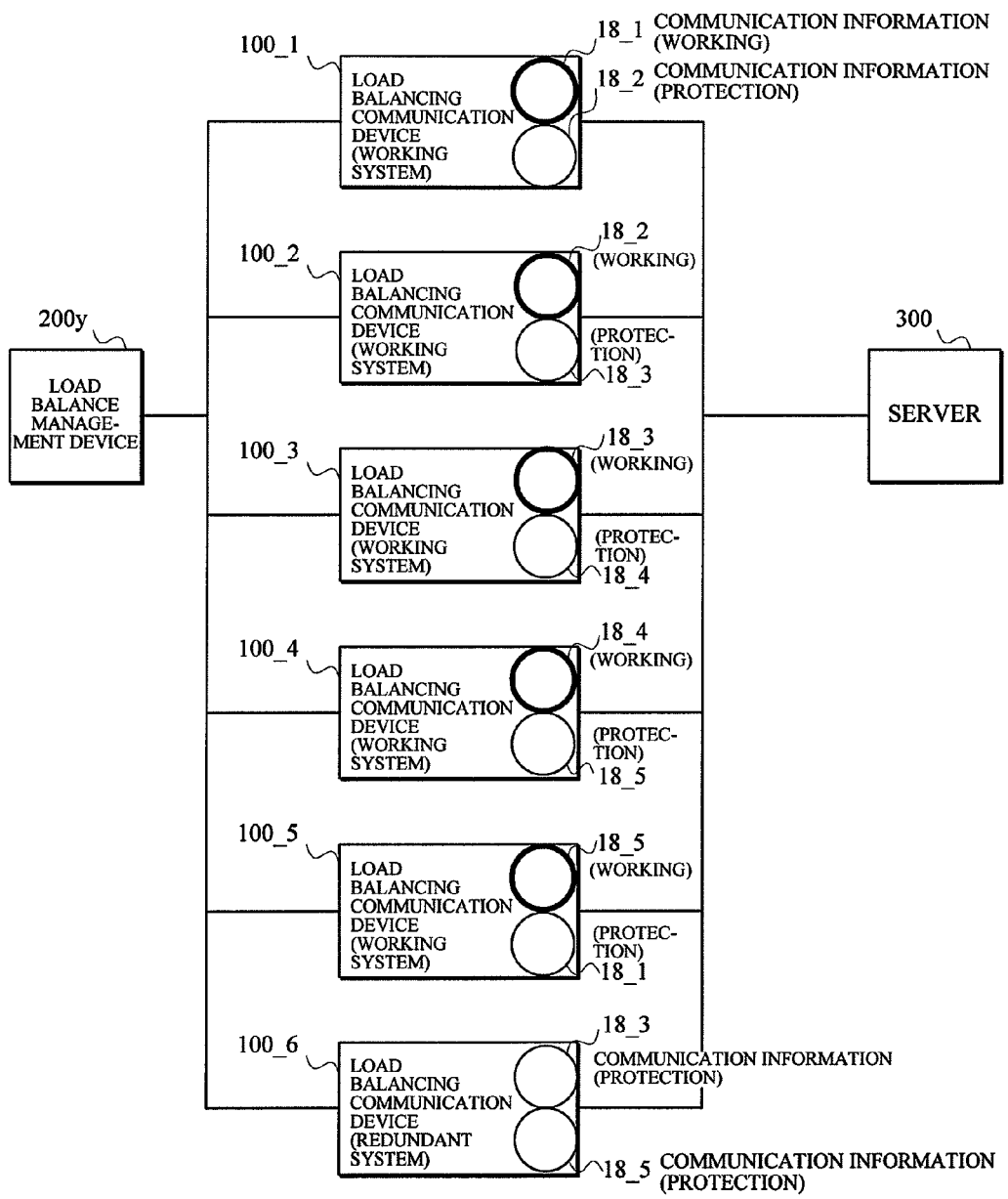
FIG. 1 is a block diagram showing a load balancing system configured by a load balancing communication device and a load balance management device according to the present invention.
Figure 3:
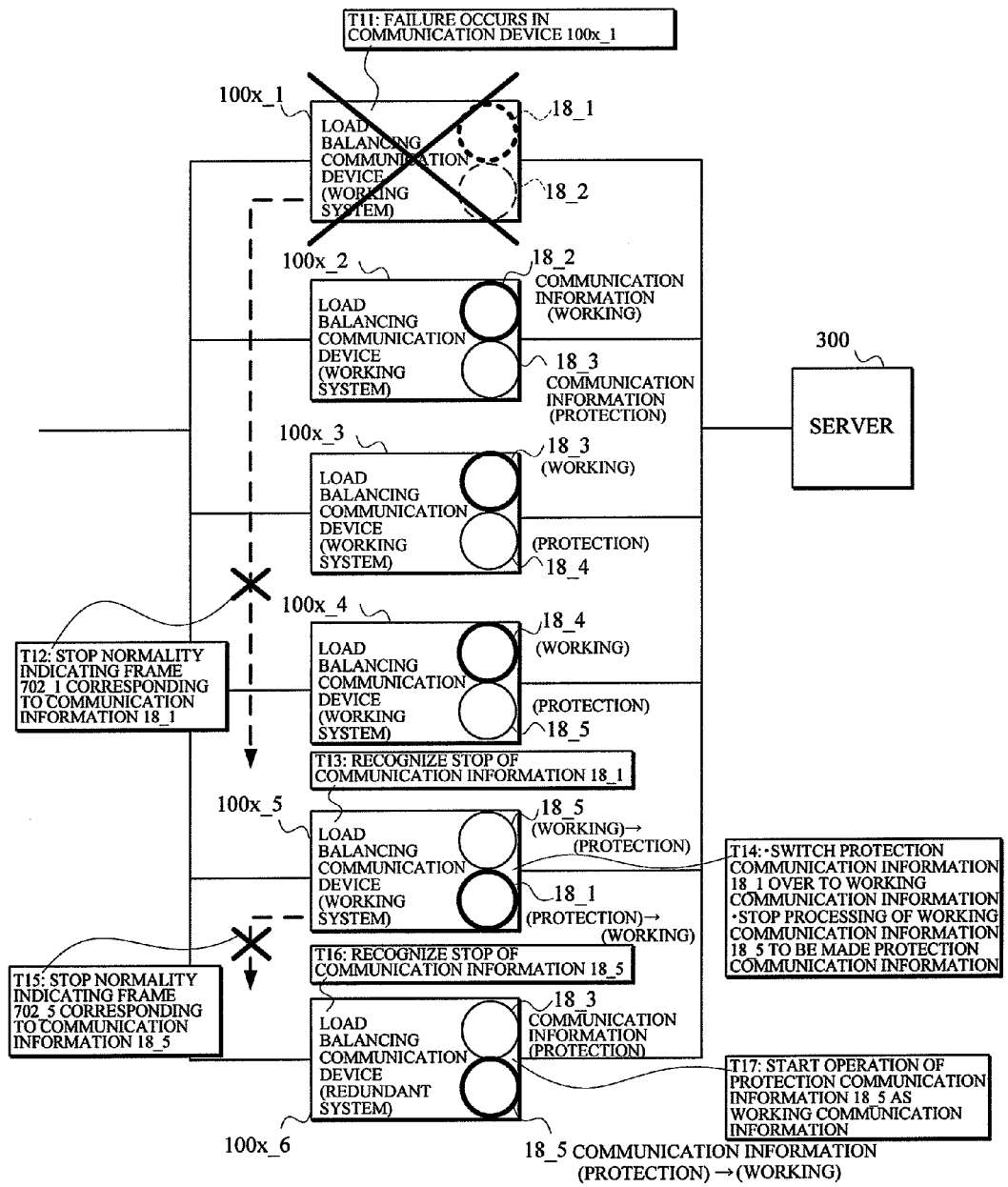
FIG. 3 is a block diagram showing a switchover principle (1) of communication processing in a load balancing communication device according to the present invention.
Figure 4:
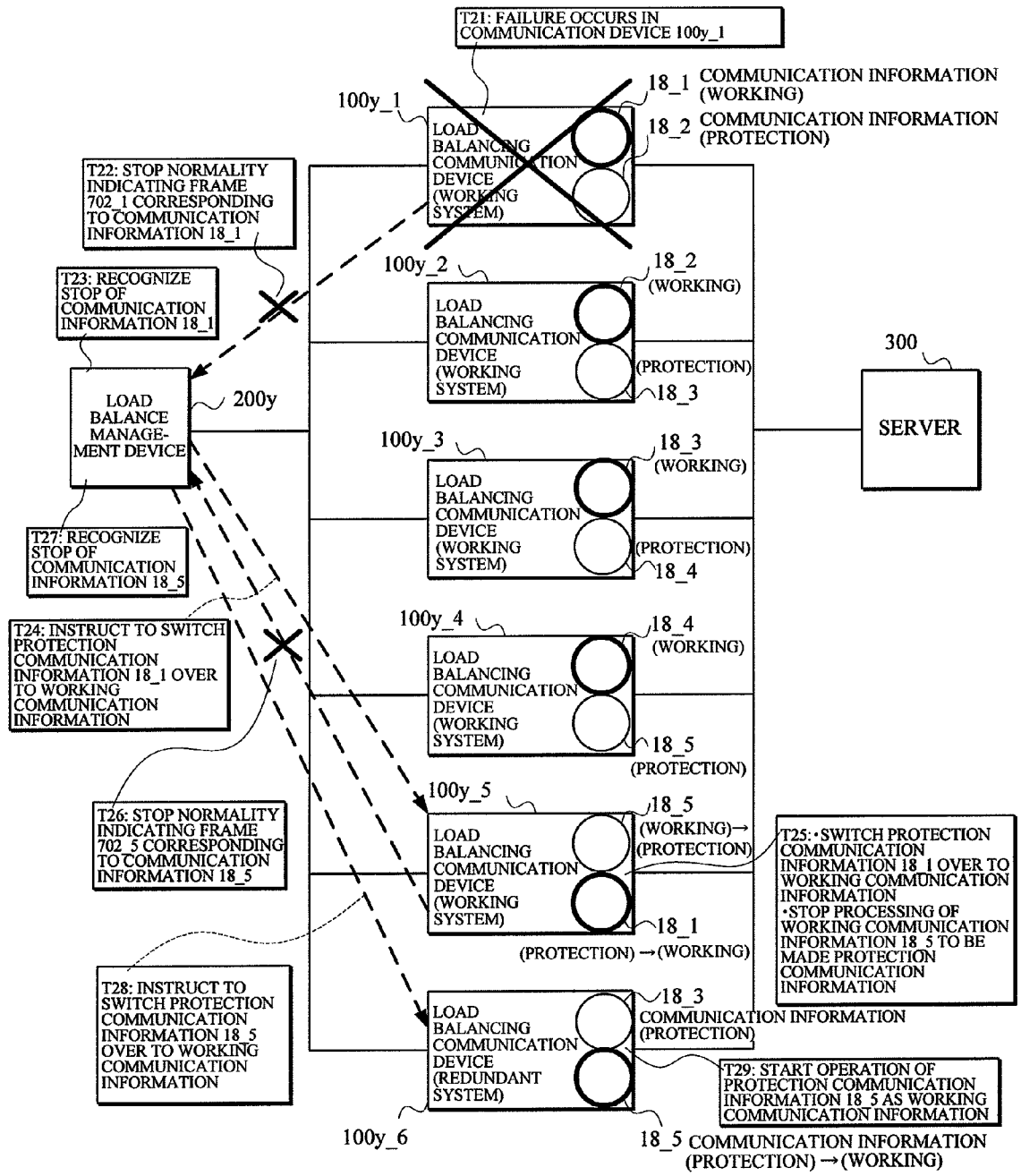
FIG. 4 is a block diagram showing a switchover principle (2) of communication processing in a load balancing communication device and a load balance management device according to the present invention.
Figure 5A:
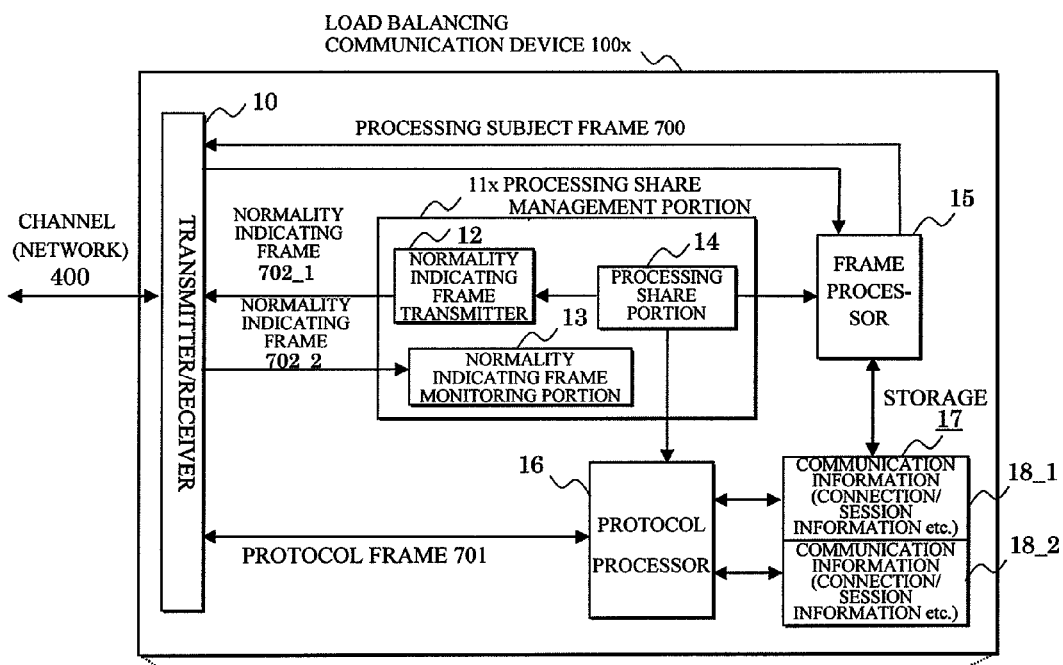
FIGS. 5A and 5B are block diagrams showing an arrangement embodiment (1) and an operation embodiment (1) of a load balancing communication device according to the present invention.

FIG. 5A shows an arrangement embodiment (1) of a load balancing communication device according to the present invention. The load balancing communication device 100x (representing the load balancing communication devices 100x_1-100x_6) has a transmitter/receiver 10, a processing share management portion 11x, a frame processor 15, a protocol processor 16, and a storage 17. The processing share management portion 11x includes a normality indicating frame transmitter 12, a normality indicating frame monitoring portion 13, and a processing share portion 14. Also, an operation area of the storage 17 has working communication information of the device 100x itself and protection communication information of another communication device. This communication information comprises connection/session information or the like.

Figure 5B:
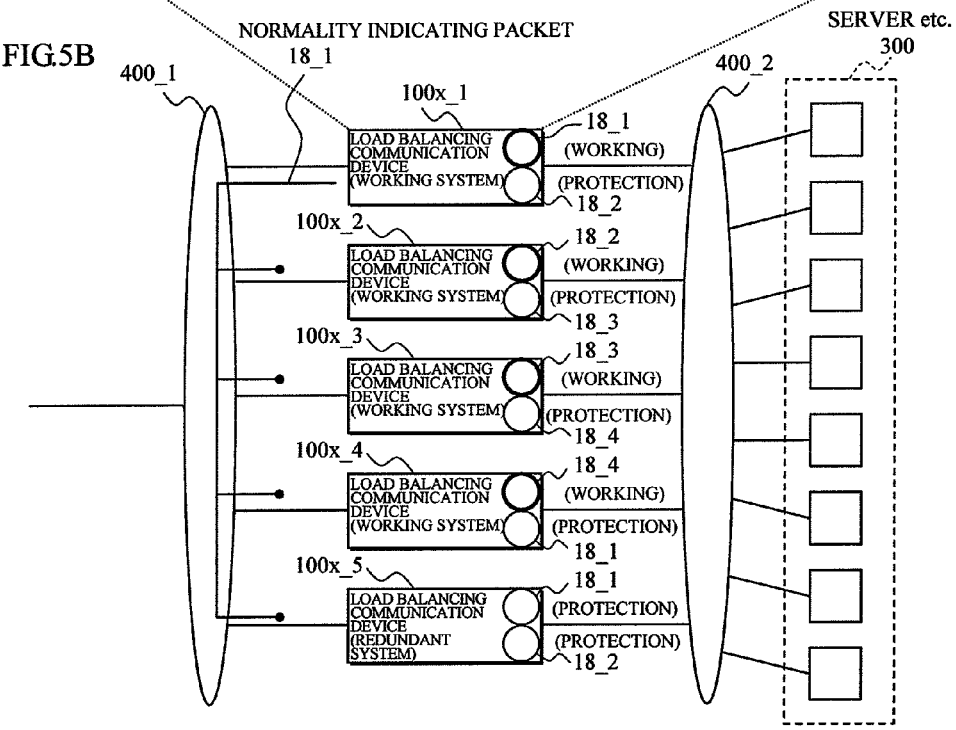

FIG. 5B shows a load balancing system configured by the load balancing communication devices 100x_1-100x_4 of the working system and the load balancing communication device 100x_5 of the redundant system. In this system, the storages 17 (see FIG. 5A) of the load balancing communication devices 100x_1-100x_4 of the working system respectively hold the working communication information 18_1-18_4 of the devices themselves, and protection communication information 18_2-18_4 and 18_1 of the other communication devices 18_2-18_4 and 18_1 of the working system. Also, the storage of the load balancing communication device 100x_5 of the redundant system holds the protection communication information 18_1 and 18_2 of the other load balancing communication devices 18_1 and 18_2 of the working system.

It is to be noted that the load balancing communication devices 100x of the working and redundant systems may have an arrangement shown in FIG. 5A. Since no specific arrangement for the load balancing communication device 100x of the redundant system is required, the load balancing communication device of the present invention has versatility.

Operation Embodiment (1)

In the operation embodiment (1), each load balancing communication device 100x autonomously shares the communication processing without the load balance management device.

FIG. 6 shows functions of the elements of the load balancing communication device 100x shown in FIG. 5A. These functions will now be described. It is to be noted that while functions of the operation embodiment (2), which will be described later, are also indicated, only the functions related to the operation embodiment (1) will now be described.

Transmitter/receiver 10: The transmitter/receiver 10 transmits/receives a processing subject frame 700 to/from an external communication device, and a protocol frame 701, a normality indicating frame 702, and the like to/from the external load balancing communication device 100x.

Processing share management portion 11x: The processing share management portion 11x is provided with the normality indicating frame transmitter 12, the normality indicating frame monitoring portion 13, and the processing share portion 14, and manages communication processing shared by the device 100x itself within the communication processing processed by the entire load balancing system.

Frame processor 15: The frame processor 15 performs the processing of the processing subject frame 700 shared by the device 100x itself.

Example 1: When the load balancing communication device 100x is a server load balancer, the frame processor 15 distributes the received frame 700 to be transmitted to a server 300.

Example 2: When the load balancing communication device 100x is a router, the frame processor 15 transmits the received frame 700 based on the routing table.

It is to be noted that this operation is common to the operation embodiment (1) and the operation embodiment (2) which will be described later.

Protocol processor 16: The protocol processor 16 receives the protocol frame 701 to perform the processing of a protocol related to the frame processing.

Example: When the load balancing communication device 100x is a router, the protocol processor 16 exchanges the protocol frame 701 including the routing information with another router, prepares and updates the routing table or the like based on the routing information.

Also, the protocol processor 16 updates both of the working communication information of master processing (communication processing shared by the device 100x itself), and protection communication information of backup processing (communication processing shared by another communication device).

Storage 17: The storage 17 holds communication information required for the frame processing (communication processing). The storage 17 holds the working communication information of the device 100x itself and the protection communication information corresponding to the working communication information of another load balancing communication device.

FIGS. 7, 8, 10, and 11 respectively show more detailed operation (function) examples of the above-mentioned transmitter/receiver 10, the processing share management portion 11x, the frame processor 15, and the protocol processor 16. Hereinafter, the detailed operations of functional portions will be described referring to the above figures.

Figure 7:
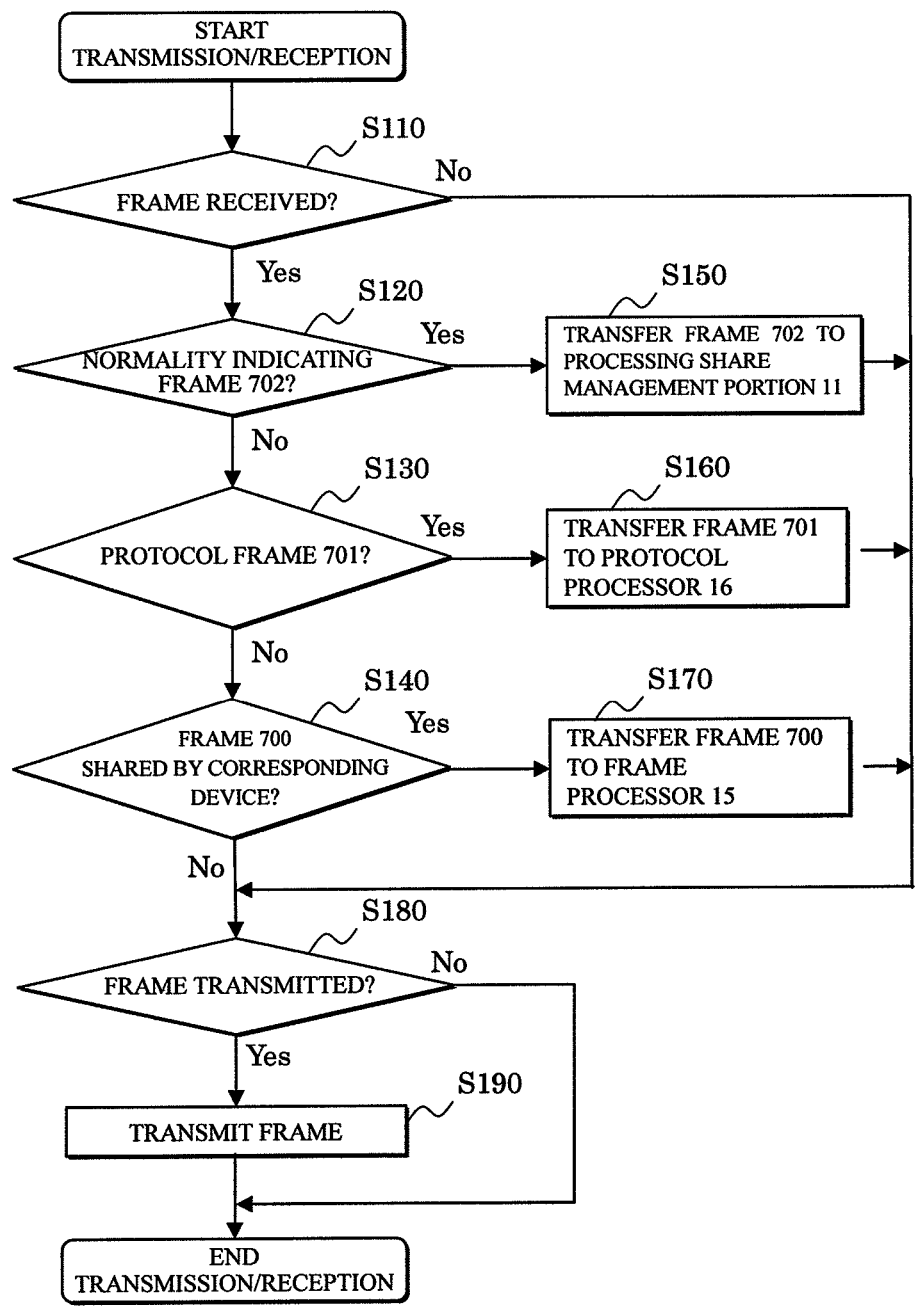
FIG. 7 is a flowchart showing an operation example of a transmitter/receiver in a load balancing communication device according to the present invention.

Detailed operation of transmitter/receiver 10 (see FIG. 7)

Steps S110-S140: The transmitter/receiver 10 determines whether the received frame is the normality indicating frame 702, the protocol frame 701, or the frame 700 shared by the corresponding device.

Step S150: When the received frame is the normality indicating frame 702, the transmitter/receiver 10 transfers the normality indicating frame 702 to the processing share management portion 11x.

Step S160: When the received frame is the protocol frame 701, the transmitter/receiver 10 transfers the protocol frame 701 to the protocol processor 16.

Step S170: When the received frame is the frame 700 shared by the corresponding device, the transmitter/receiver 10 transfers the frame 700 to the frame processor 15.

Steps S180 and S190: When receiving the normality indicating frame 702, the protocol frame 701, and the frame 700 respectively from the normality indicating frame transmitter 12, the protocol processor 16, and the frame processor 15, the transmitter/receiver 10 transmits these frames 700-702 to a communication channel (network) 400.

Figure 8:
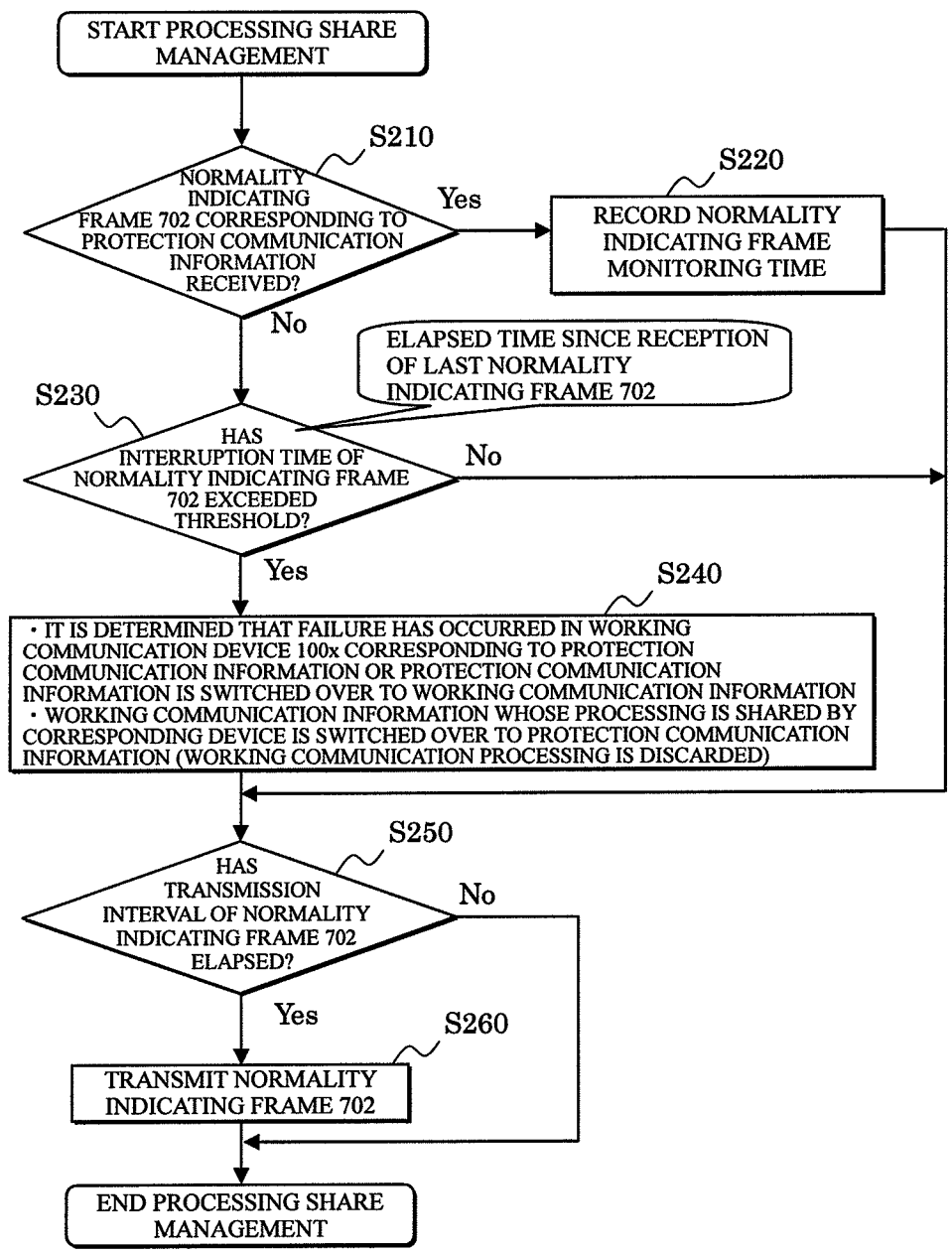
FIG. 8 is a flowchart showing an operation example of a processing share management portion in a load balancing communication device according to the present invention.
Figure 9:
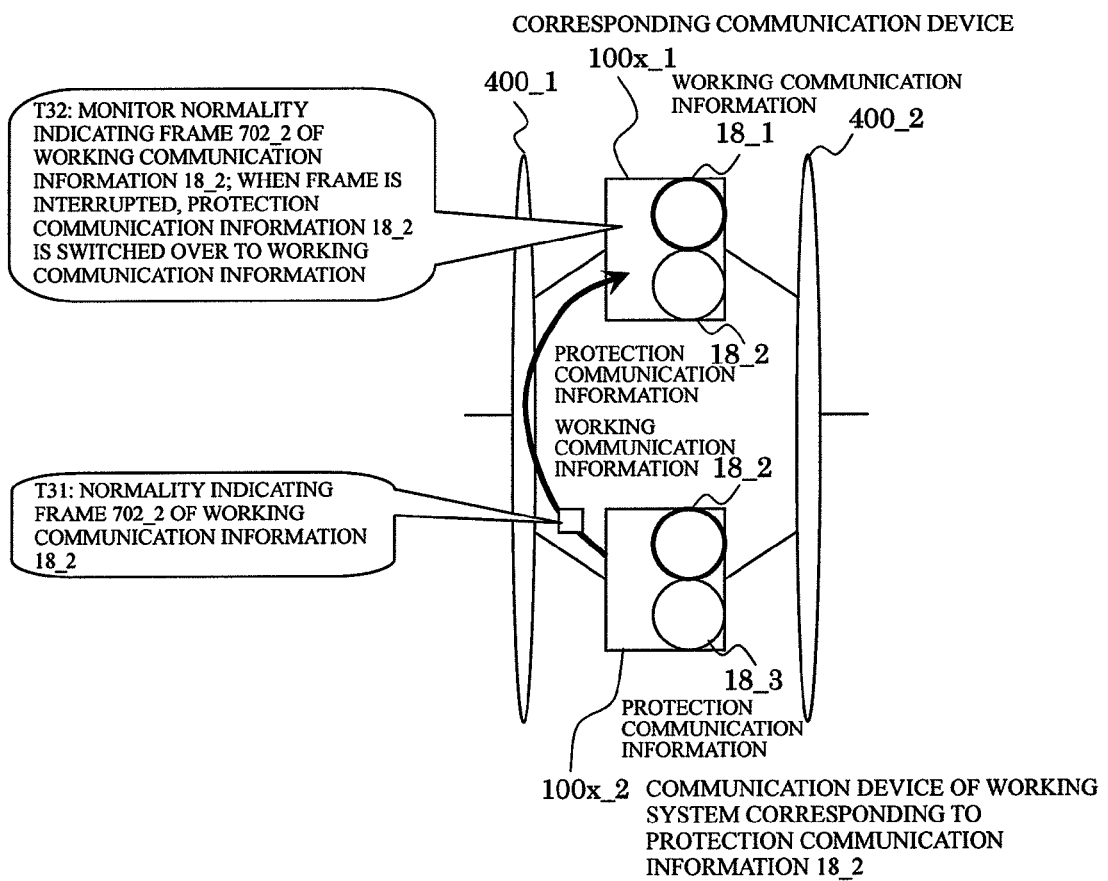
FIG. 9 is a block diagram showing an operation example of switching protection communication information over to working communication information at a time of a failure occurrence or the like of a load balancing communication device according to the present invention.

Detailed operation of processing share management portion 11x (see FIGS. 8 and 9)

FIG. 9 shows an operation example of switching the protection communication information over to the working communication information upon a failure occurrence. Hereinafter, a detailed operation of the processing share management portion 11x will be described referring to FIGS. 9 and 8.

Steps S210 and S220: When receiving the normality indicating frame 702 and holding in the storage 17 the protection communication information corresponding to the working communication information of the communication device 100x having transmitted the normality indicating frame 702, the normality indicating frame monitoring portion 13 in the processing share management portion 11x records time having received the frame associated with the protection information, and then the process proceeds to step S250.

Steps S230 and S240: When the normality indicating frame 702 corresponding to the protection communication information 18_2 is interrupted (not received) for more than a predetermined threshold time (see step T32 in FIG. 9), the normality indicating frame monitoring portion 13 determines that a failure has occurred in the load balancing communication device 100x of the working system corresponding to the protection communication information 18_2, or the protection communication information held by the communication device 100x of the working system is switched over to the working communication information, and notifies this switchover to the processing share portion 14. The processing share portion 14 switches the working communication information 18_1 over to the protection communication information 18_2 over to the working communication information (see at step T32), thereby taking over the communication processing of the working communication device 100x.

Steps S250 and S260: In the processing share management portion 11x, the normality indicating frame transmitter 12 transmits the normality indicating frame 702 indicating that the corresponding device normally performs communication processing based on the working communication information 18_1 at a predetermined transmission interval (see step T31 in FIG. 9).

Figure 10:
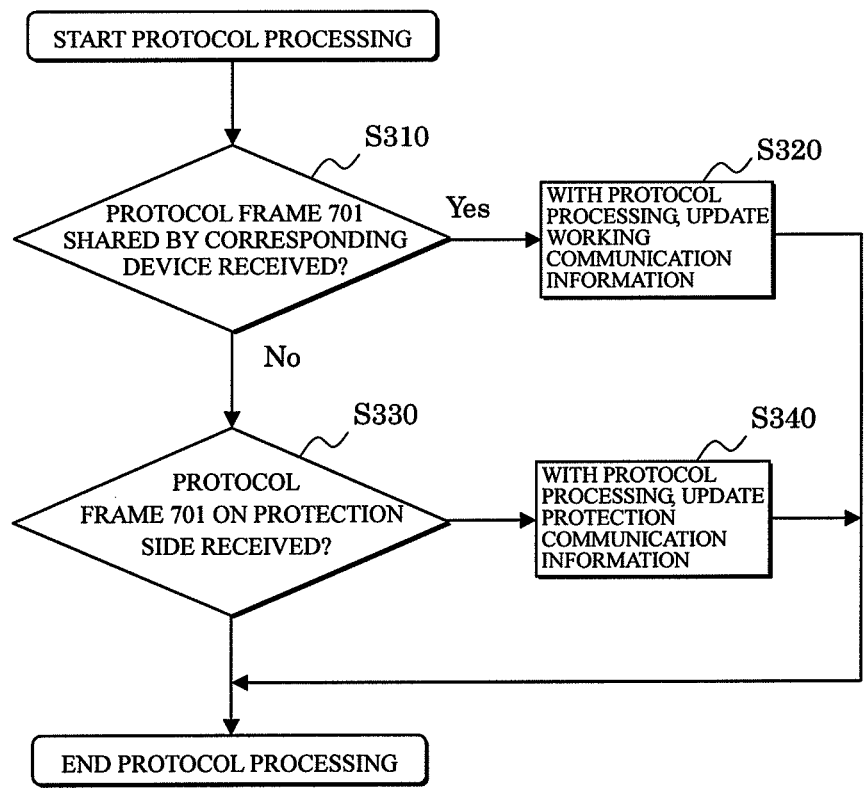
FIG. 10 is a flowchart showing an operation example of a protocol processor in a load balancing communication device according to the present invention.

Detailed operation of protocol processor 16 (see FIG. 10)

Steps S310 and S320: When receiving the protocol frame 701 whose processing is shared by the corresponding device, the protocol processor 16 performs protocol processing and updates the working communication information 18_1.

Steps S330 and S340: When receiving the protocol frame 701 corresponding to the protection communication information 18_2, the protocol processor 16 performs protocol processing and updates the protection communication information 18_2.

Figure 11:
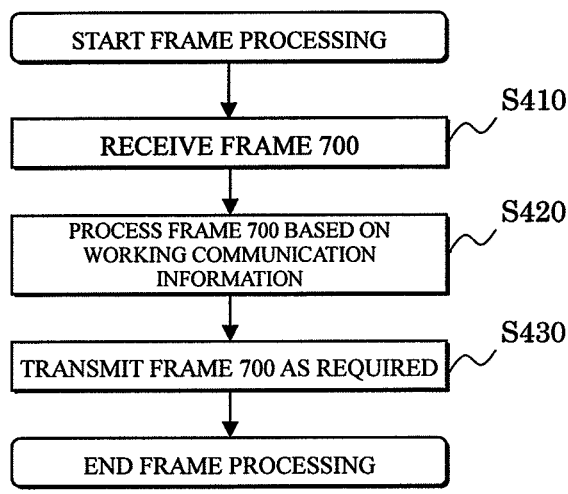
FIG. 11 is a flowchart showing an operation example of a frame processor in a load balancing communication device according to the present invention.

Detailed operation of frame processor 15 (see FIG. 11)

Steps S410-S430: The frame processor 15 performs the processing of the received frame 700 based on the working communication information and transmits the frame 700 as required.

Arrangement Embodiment (2)

Figure 12A:
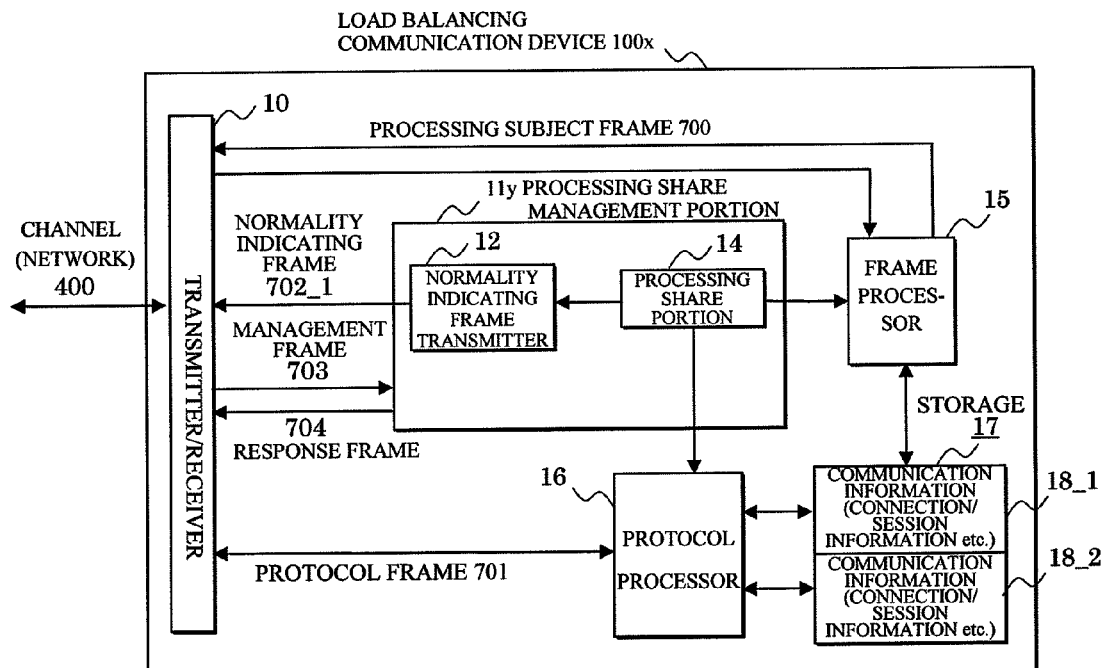
FIGS. 12A and 12B are block diagrams showing an arrangement embodiment (2) and an operation embodiment (2) of a load balancing communication device according to the present invention.

FIG. 12A shows an arrangement embodiment (2) of a load balancing communication device 100y. This communication device 100y is different from the load balancing communication device 100x shown in FIG. 5A in that the normality indicating frame monitoring portion 13 held by the processing share management portion 11x is not used.

Figure 12B:
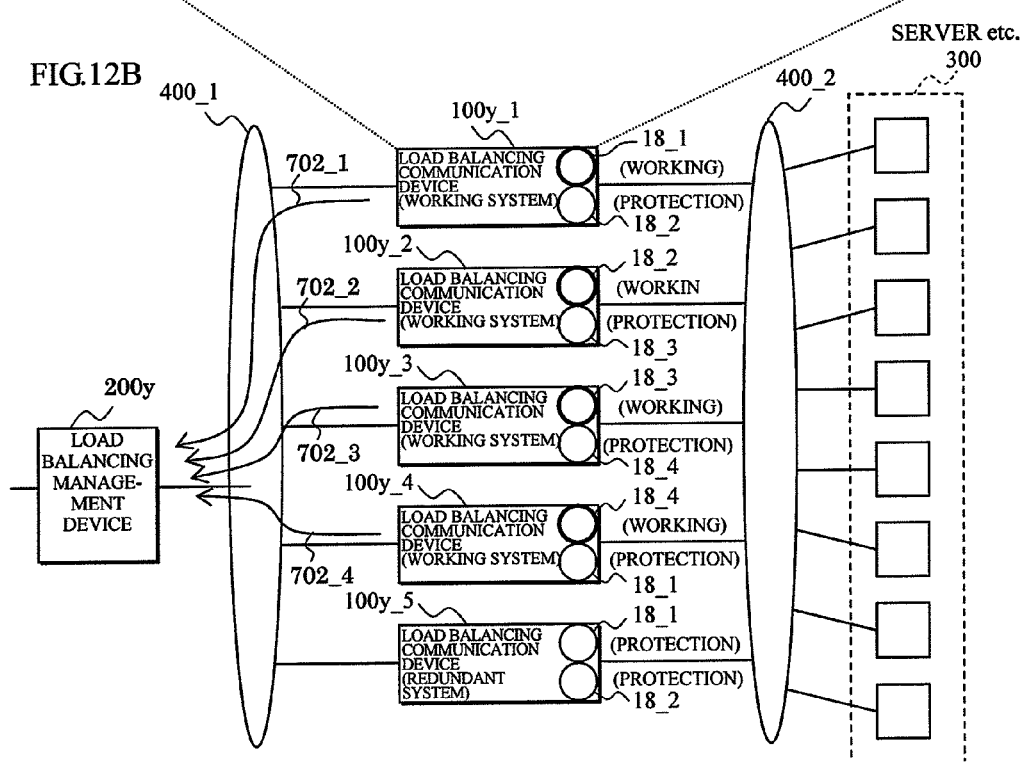

FIG. 12B shows a load balancing system configured by load balancing communication devices 100y_1-100y_5 (hereinafter, occasionally represented by a reference numeral 100y) and a load balance management device. This load balancing system is different from the load balancing system shown in FIG. 5B in that a load balance management device 200y is added, and that the load balancing communication device 100y switches the protection communication information over to the working communication information based on the instructions of the load balance management device 200y to perform communication processing of the frame 700.

Arrangement Embodiment of Load Balance Management Device

Figure 13:
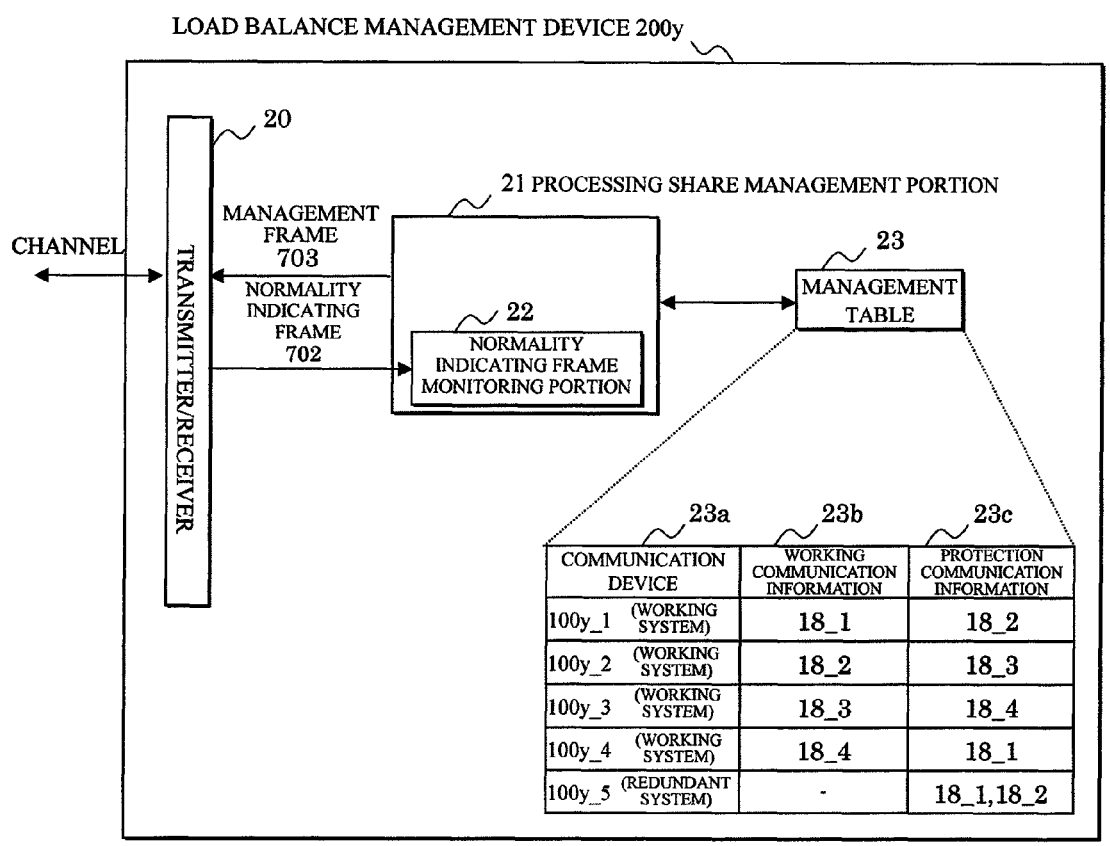
FIG. 13 is a block diagram showing an arrangement embodiment of a load balance management device according to the present invention.

FIG. 13 shows an arrangement embodiment of the load balance management device 200y, which has a transmitter/receiver 20, a processing share management portion 21, and a management table 23. The processing share management portion 21 includes a normality indicating frame monitoring portion 22. The management table 23 is composed of a communication device 23a, working communication information 23b, and protection communication information 23c. It is indicated in FIG. 13 that e.g. the communication device 100y_1 of the working system holds the working communication information 18_1 of the device 100y_1 itself and the protection communication information 18_2 corresponding to the working communication information 18_2 of the working communication device 100y_2. Also, it is indicated that the communication device 100y_5 of the redundant system holds the protection communication information 18_1 and 18_2 of the communication devices 100y_1 and 100y_2 of the working system.

Operation Embodiment (2)

In operation embodiment (2), while the load balancing communication devices 100y_1-100y_5 (hereinafter, occasionally represented by a reference numeral 100y) transmit the normality indicating frame 702 in the same way as the embodiment (1), the load balance management device 200y monitors the normality indicating frame 702 to detect a failure of the communication device 100y. The load balance management device 200y having detected the failure instructs a predetermined load balancing communication device 100x to switch the protection communication information over to the working communication information based on the management table 23. According to the instructions, the load balancing communication device 100y switches the protection communication information over to the working communication information to perform the communication processing of the frame 700.

Operation Embodiment of the Load Balance Management Device 200y

Figure 14:
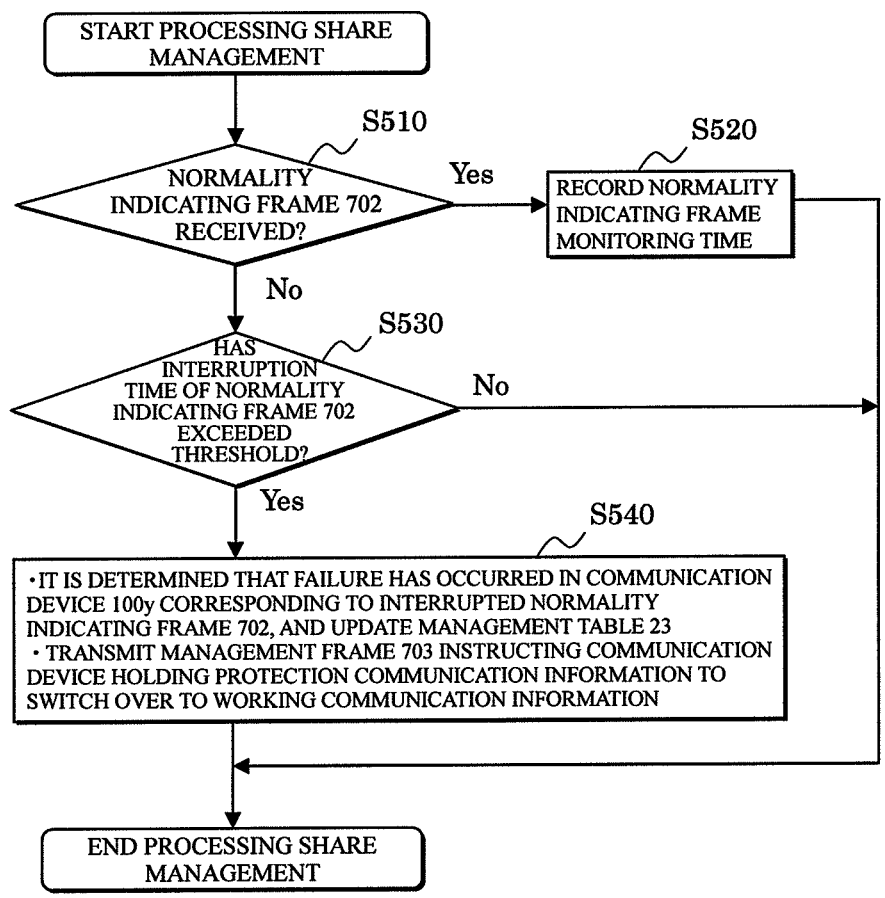
FIG. 14 is a flowchart showing an operation example of a processing share management portion in a load balance management device according to the present invention.

FIG. 14 shows an operation example of the processing share management portion 21 in the load balance management device 200y. This operation example will now be described.

Steps S510 and S520: In the processing share management portion 21, the normality indicating frame monitoring portion 22 monitors the normality indicating frame 702 received through the transmitter/receiver 20, and records, when the normality indicating frame 702 is received, the load balancing communication device 100y having transmitted the normality indicating frame 702 associated with the time of the frame reception.

Steps S530 and S540: When the normality indicating frame 702 from each communication device 100y is interrupted for more than a predetermined time (threshold), the normality indicating frame monitoring portion 22 determines that a failure has occurred in the communication device 100y corresponding to the normality indicating frame. The normality indicating frame monitoring portion 22 updates the management table 23 so as to perform communication processing corresponding to the failure, and transmits the management frame 703 instructing the communication device holding the protection communication information to switch the protection communication information over to the working communication information, based on the updated management table 23.

FIGS. 15A-15D show a detailed operation example (1) of the processing share management portion 21 corresponding to the management table 23. Hereinafter, the detailed operation example (1) will be described.

It is indicated in the management table 23 shown in FIG. 15A that the communication devices 100y_1-100y_4 of the working system and the communication device 100y_5 of the redundant system respectively hold the working communication information 18_1 and the protection communication information 18_2, the working communication information 18_2 and the protection communication information 18_3, the working communication information 18_3 and the protection communication information 18_4, the working communication information 18_4 and the protection communication information 18_1, and the protection communication information 18_1 and 18_2.

Steps T41 and T42: When the normality indicating frame 702 from the communication device 100y_4 is stopped or rested, the processing share management portion 21 recognizes that the communication processing based on the working communication information 18_4 of the communication device 100y_4 is stopped, and then switches this communication processing over to the communication device 100y_3 holding the protection communication information 18_4 corresponding to the communication information 18_4. By this switchover, the communication processing based on the working communication information 18_3 is stopped, so that this communication processing is switched over to the communication device 100_2 holding the protection communication information 18_3. Hereinafter, the management table 23 is similarly updated until the protection communication information 18 held by the communication device 100_5 of the redundant system is switched over to the working communication information. FIGS. 15B and 15C respectively show the update process and the update result.

Step T43: The processing share management portion 21 transmits to the communication devices 100y_2, 100y_3, and 100y_5 the management frames 703_1-703_3 for instructing the communication devices 100y_2, 100y_3, and 100y_5 to switch the protection communication information over to the working communication information, and the working communication information over to the protection communication information based on the update result of the management table 23 (see FIG. 15D).

FIGS. 16A-16D show a detailed operation example (2) of the processing share management portion 21 corresponding to the management table 23.

The management table shown in FIG. 16A is different from the management table 23 shown in FIG. 15A in that the protection communication information 18_4 is held instead of the protection communication information 18_2 in the communication device 100y_5 of the redundant system. Hereinafter, the detailed operation example (2) will be described.

Steps T51 and T42: When the normality indicating frame 702 from the communication device 100y_4 is stopped, it is recognized that the communication processing based on the working communication information 18_4 of the communication device 100y_4 is stopped, so that the management table 23 is updated so as to preferentially switch the communication device 100y_4 over to the communication device 100y_5 of the redundant system within the communication devices 100y_3 and 100y_5 holding the protection communication information 18_4 corresponding to the communication information 18_4 (see FIGS. 16B and 16C).

Step T53: The processing share management portion 21 transmits to the communication device 100y_5 the management frame 703 instructing the communication device 100y_5 to switch the protection communication information over to the working communication information and the working communication information over to the protection communication information based on the update result of the management table 23 (see FIG. 16D).

Operation of the Load Balancing Communication Device 100y

In FIG. 6, only the function of the processing share management portion 11y of the load balancing communication device 100y in the arrangement embodiment (2) is different from the function of the above-mentioned arrangement embodiment (1). The processing share management portion 11y manages the communication processing according to the instructions of the load balance management device 200y.

Figure 17:
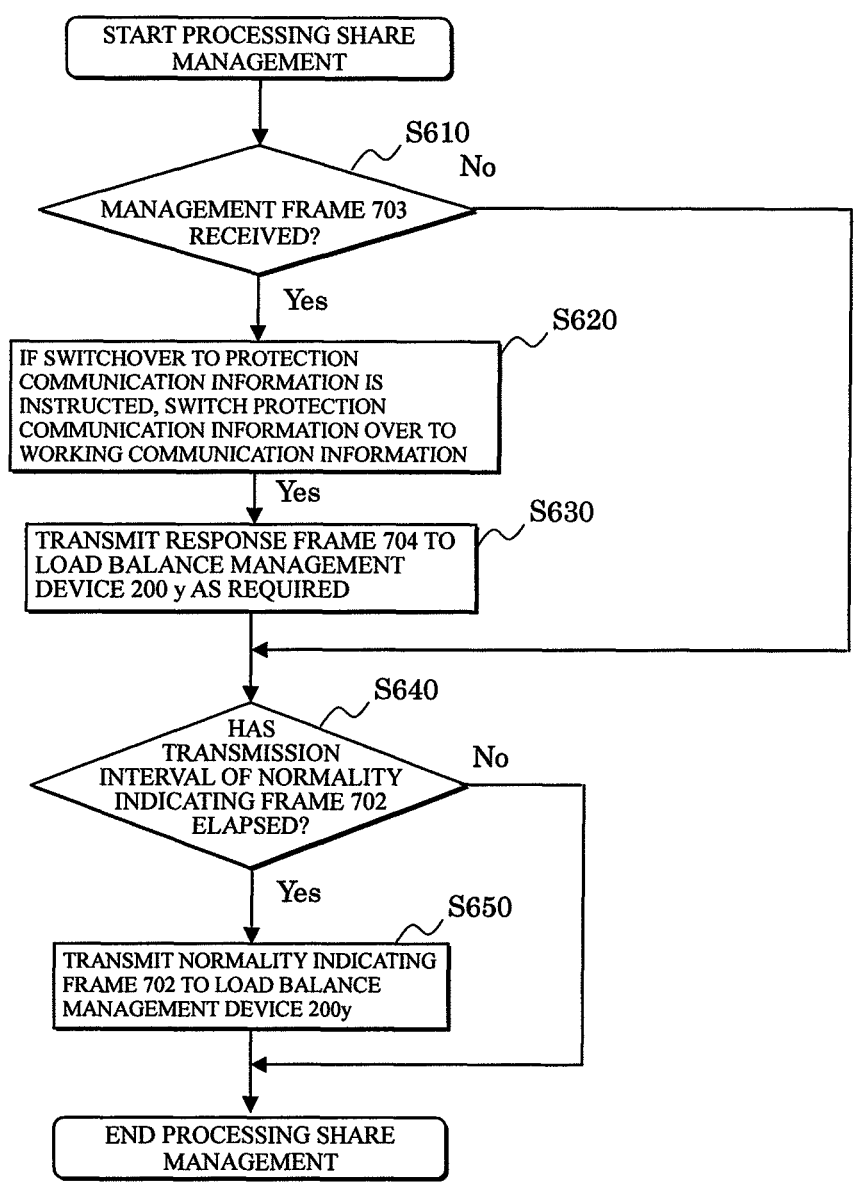
FIG. 17 is a flowchart showing an operation example of a processing share management portion in a load balancing communication device according to the present invention.

FIG. 17 shows an operation example of the processing share management portion 11y in the load balancing communication device 100y. The operation example will now be described.

Steps S610-S630: When receiving the management frame 703 addressed to the device 100y itself from the load balance management device 200y, the processing share management portion 11y switches e.g. the designated protection communication information 18_2 over to the working communication information (the communication information 18_1 which has been working so far is switched over to the protection communication information 18_1) to perform communication processing. Namely, in the processing share management portion 11y, the processing share portion 14 instructs the frame processor 15 and the protocol processor 16 to perform the communication processing with the communication information 18_2 which has become the working communication information. Also, the processing share management portion 11y transmits to the load balance management device 200y, as required, a response frame 704 for the management frame 703.

Steps S640-S650: When the transmission time interval of the normality indicating frame 702 has elapsed in the processing share management portion 11y, the normality indicating frame transmitter 12 transmits the normality indicating frame 702 to the load balance management device 200y.

Operation Embodiment (3)

Figure 18A:
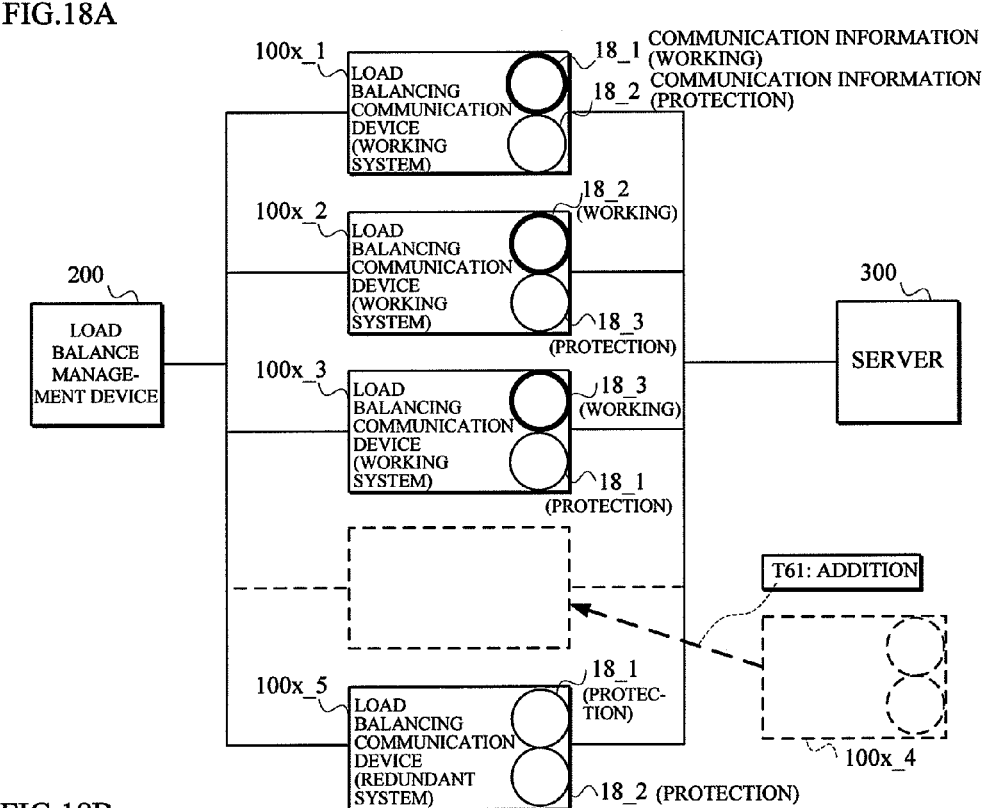
FIGS. 18A and 18B are block diagrams showing an operation embodiment (3) of a load balancing communication device according to the present invention.
Figure 18B:
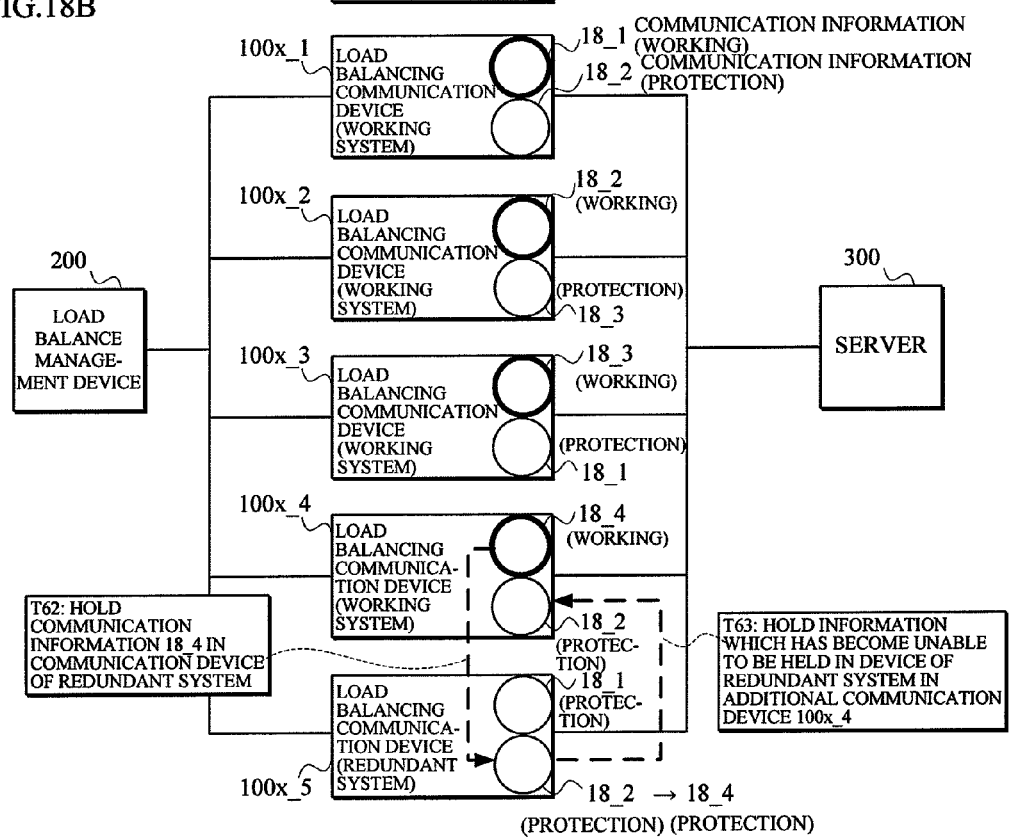

FIGS. 18A and 18B show an operation embodiment (3) of the load balancing communication device 100x (100y) of the present invention. The arrangement of the load balancing system shown in FIG. 18A is different from the system configuration shown in FIG. 5B in that the load balancing communication device 100x_4 is not connected.

This embodiment (3) shows a system or method in which the load balancing communication devices share and hold the working and protection communication information 18 when, for example, a transmission capacity for the entire load balancing system runs short and the load balancing communication device 100x_4 is added (see FIG. 18B). This method will now be described.

Step T61: The load balancing communication device 100x_4 is added to the load balancing system, so that the load balancing communication device 100x_4 holds the working communication information 18_4 corresponding to the communication processing which is shared by the device 100x_4 itself.

Step T62: The load balancing communication device 100x_5 of the redundant system holds the protection communication information 18_4 corresponding to the working communication information 18_4 of the added load balancing communication device 100x_4 in place of the protection communication information 18_2 which has been held so far.

Step T63: The added load balancing communication device 100x_4 holds the protection communication information 18_2 which the load balancing communication device 100x_5 of the redundant system has held so far. Thus, it becomes possible to autonomously add the load balancing communication device to the load balancing system.

Operation Embodiment (4)

Figure 19A:
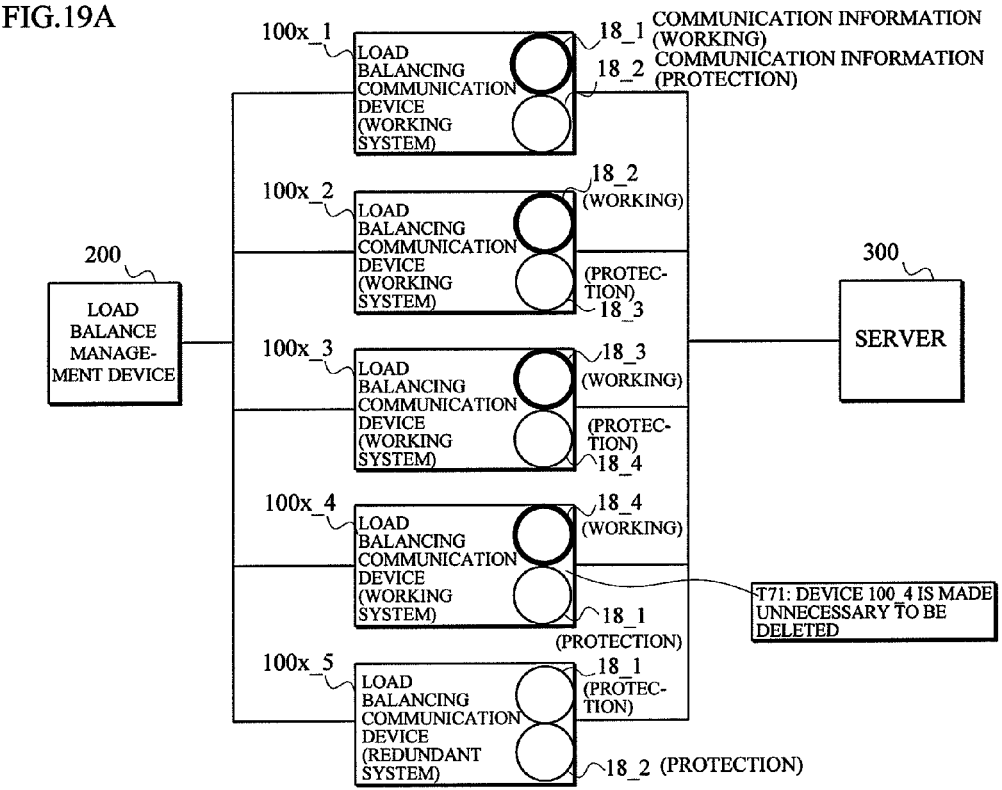
FIGS. 19A and 19B are block diagrams showing an operation embodiment (4) of a load balancing communication device according to the present invention.
Figure 19B:
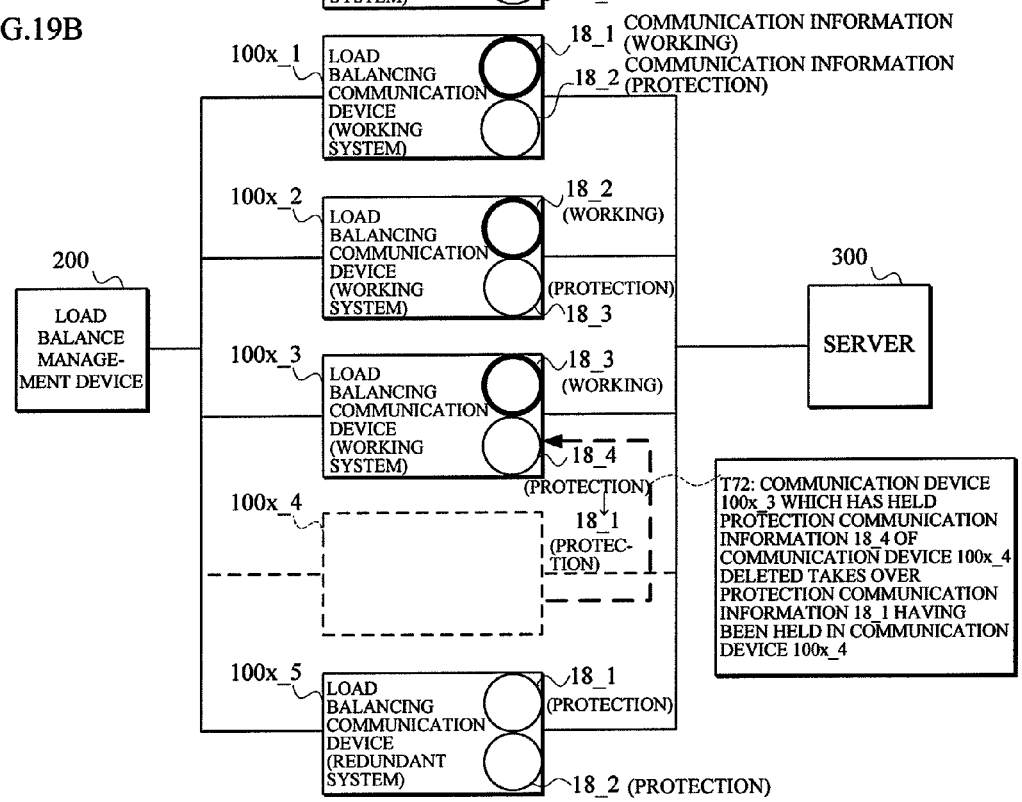
Figure 20:
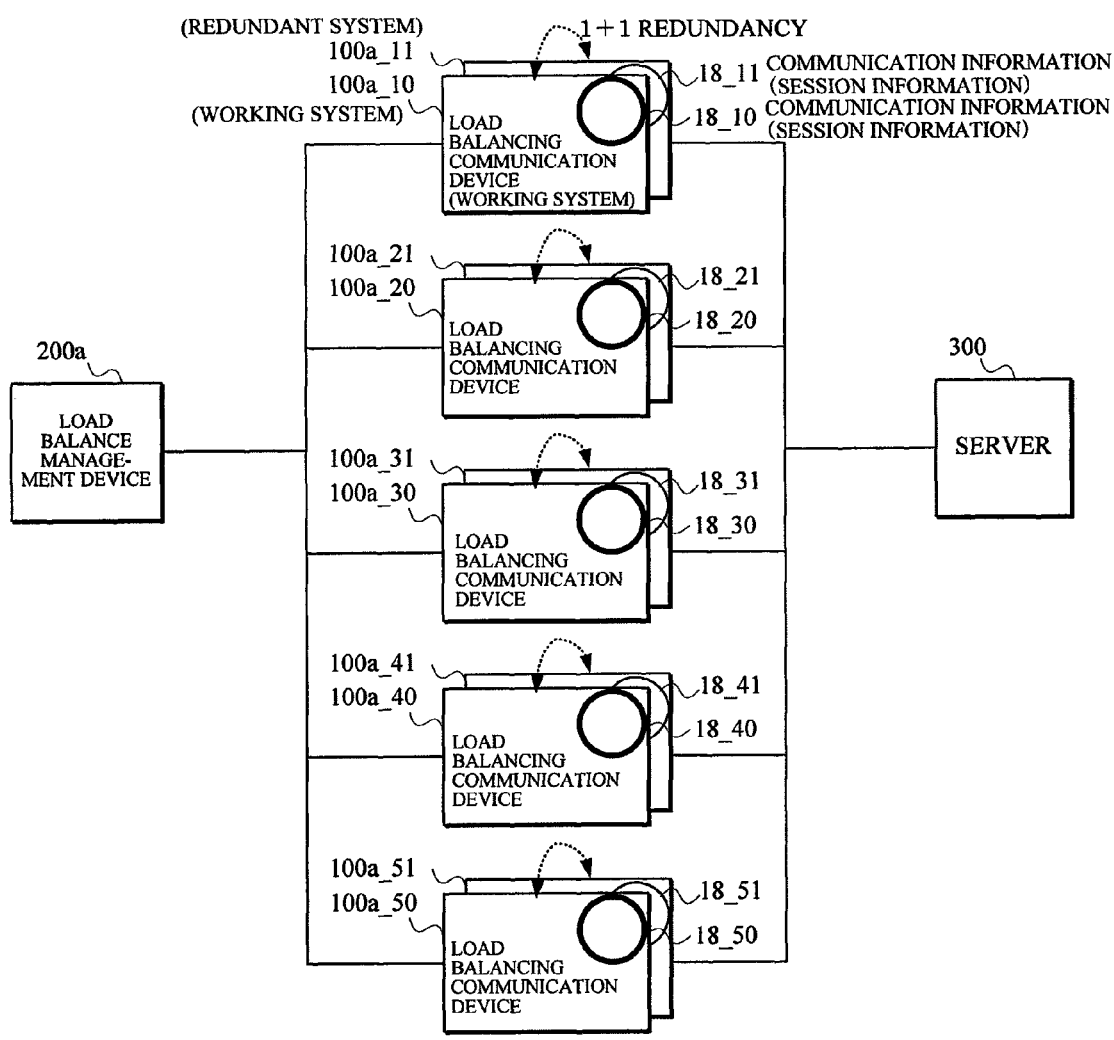
FIG. 20 is a block diagram showing a load balance redundancy (1+1 redundancy) method (1) by a prior art load balancing communication device.
Figure 21:
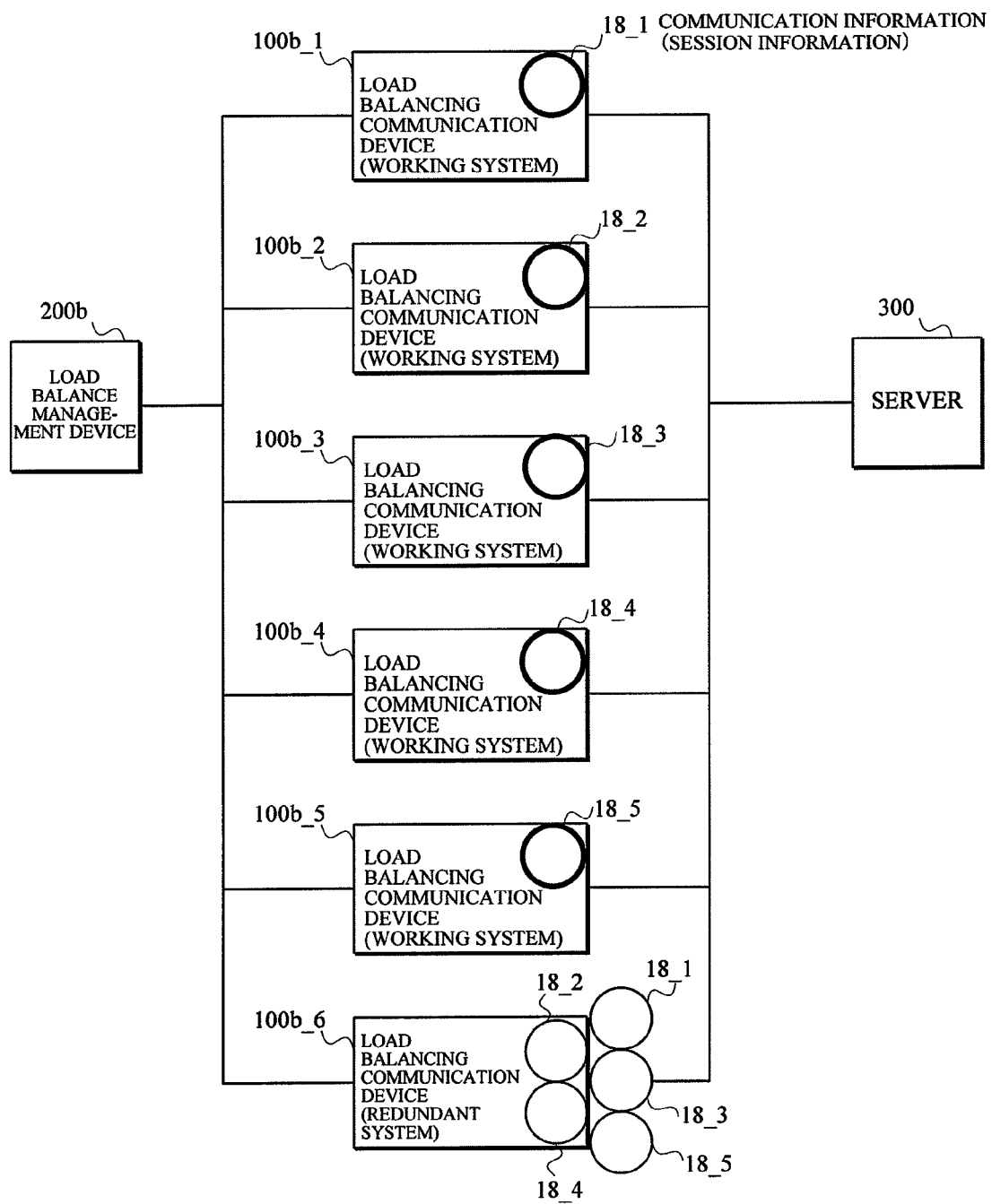
FIG. 21 is a block diagram showing a load balance redundancy (N+1 redundancy) method (2) by a prior art load balancing communication device.

FIGS. 19A and 19B show an operation embodiment (4) of the load balancing communication device 100x (100y) of the present invention. The arrangement of the load balancing system shown in FIG. 19A is the same as the system configuration shown in FIG. 5B. This embodiment (4) shows a method in which the load balancing communication devices 100x share and hold the working and protection communication information 18 when, for example, the load balancing communication device 100x_4 which has become unnecessary is deleted from the load balancing system (see FIG. 19B). This method will now be described.

Step T71: The load balancing communication device 100x_4 which has become unnecessary is deleted from the load balancing system.

Step T72: The load balancing communication device 100x_3 holding the protection communication information 18_4 of the deleted load balancing communication device 100x_4 takes over and holds the protection communication information 18_1 which has been held by the deleted load balancing communication device 100x_4 in place of the unnecessary protection communication information 18_4. Thus, it becomes possible to autonomously delete the load balancing communication device from the load balancing system.

It is to be noted that while the storage (resources) only holds the working communication information and a single protection communication information in the above-mentioned operation embodiments (1)-(4), it may hold plural pieces of protection communication information. Similarly, while the load balancing system is composed of a plurality of load balancing communication devices of the working system and a single load balancing communication device of the redundant system, a plurality of load balancing communication devices of the redundant system may be connected to the system. While resources are increased in these cases, it becomes possible to reduce the number of switchovers of the communication processing.

What is claimed is:

1. A load balancing communication device of a working system and a redundant system configuring a load balancing system comprising:
a storage initially holding:
working communication information of the device itself and protection communication information substituted for working communication information of another or other load balancing communication devices of the working system when the device is a load balancing communication device of the working system, or
protection communication information substituted for working communication information of at least two other load balancing communication devices of the working system without holding working communication information of the device itself when the device is a load balancing communication device of the redundant system;
a frame processor performing communication processing of a frame based on the working communication information; and
a processing share management portion;
when being informed that communication processing can be no longer performed with the working communication information in the load balancing communication device of the working system where a fault has occurred, the processing share management portion in the another load balancing communication device of the working system instructing the frame processor to perform communication processing with the protection communication information stored for the working communication information of the faulted load balancing communication device, in which the load balancing communication device of the redundant system when being informed that communication processing with the working communication information of the another load balancing communication device of the working system can be no longer performed performs communication processing with the protection communication information stored for the working communication information of the another load balancing communication device of the working system.

2. The load balancing communication device as claimed in claim 1, wherein protection communication information corresponding to working communication information of all load balancing communication devices of the working system is set so as to be held in at least another load balancing communication device.

3. The load balancing communication device as claimed in claim 1, wherein when there are plural pieces of protection communication information corresponding to identical working communication information, a priority is relatively set to each of the protection communication information.

4. The load balancing communication device as claimed in claim 3, wherein the priority of the protection communication information stored in the storage of the load balancing communication device of the redundant system is set higher than the priority of the protection communication information stored in the storage of the load balancing communication device of the working system.

5. The load balancing communication device as claimed in claim 1, wherein the processing share management portion transmits a normality indicating frame indicating that the device normally performs communication processing, and recognizes a load balancing communication device where a failure has occurred, based on a normality indicating frame from another load balancing communication device.

6. The load balancing communication device as claimed in claim 1, wherein in case that a load balancing communication device of the working system is further added to the load balancing system, the device which is the load balancing communication device of the redundant system holds protection communication information corresponding to working communication information of the added load balancing communication device of the working system, and the device which is the added load balancing communication device of the working system holds its own working communication information and protection communication information which has become unable to be held when the load balancing communication device of the redundant system holds the protection communication information corresponding to the working communication information of the added load balancing communication device of the working system.

7. The load balancing communication device as claimed in claim 1, wherein in case that the load balancing communication device of the working system is deleted from the load balancing system, the device holds protection communication information of the deleted load balancing communication device.

8. A load balance management device connected to the load balancing communication device of the working system and the redundant system as claimed in claim 1 comprising:
 a management table managing the working communication information and the protection communication information held by the load balancing communication device of the working system or the redundant system;
 a monitoring portion monitoring whether or not a failure has occurred in the load balancing communication device of the working system; and
 a processing share management portion instructing, by referring to the management table, the load balancing communication device holding the protection communication information corresponding to the load balancing communication device of the working system where the failure has occurred, to perform communication processing by making the protection communication information the working communication information.

9. The load balance management device as claimed in claim 8, wherein when there are plural pieces of protection communication information corresponding to identical working communication information in the management information table, a priority is set to the protection communication information, and the processing share management portion instructs a load balancing communication device selected based on the priority to perform the communication processing.

10. The load balance management device as claimed in claim 8, wherein a priority of the protection communication information held by the load balancing communication device of the redundant system is set, in the table, higher than the priority of the protection communication information stored in the storage of the load balancing communication device of the working system.

11. A communication system comprising:
 a server; and
 a plurality of load balancing communication devices connected to the server in parallel;
 each of the load balancing communication devices comprising:
  a storage initially holding:
   working communication information of the device itself and protection communication information substituted for working communication information of another or other load balancing communication devices when the device is a load balancing communication device of a working system, or
   protection communication information substituted for working communication information of at least two other load balancing communication devices of the working system without holding working communication information of the device itself when the device is a load balancing communication device of a redundant system;
  a frame processor performing communication processing of a frame based on the working communication information when the device is the load balancing communication device of the working system; and
  a processing share management portion instructing the frame processor to perform communication processing with the protection communication information stored for the working communication information of other load balancing communication device of the working system when being informed that communication processing can be no longer performed with the working communication information in the other load balancing communication device.

* * * * *